US012741283B2

(12) United States Patent
Stango

(10) Patent No.: US 12,741,283 B2
(45) Date of Patent: Sep. 22, 2026

(54) TISSUE HOLDER ASSEMBLY AND COMPONENTS THEREOF

(71) Applicant: HOLOGIC, INC., Marlborough, MA (US)

(72) Inventor: Tim Stango, Marlborough, MA (US)

(73) Assignee: Hologic, Inc., Marlborough, MA (US)

( * ) Notice: Subject to any disclaimer, the term of this patent is extended or adjusted under 35 U.S.C. 154(b) by 908 days.

(21) Appl. No.: 17/779,806

(22) PCT Filed: Nov. 25, 2020

(86) PCT No.: PCT/US2020/062187
§ 371 (c)(1),
(2) Date: May 25, 2022

(87) PCT Pub. No.: WO2021/108521
PCT Pub. Date: Jun. 3, 2021

(65) Prior Publication Data

US 2023/0012310 A1 Jan. 12, 2023

Related U.S. Application Data

(60) Provisional application No. 62/941,194, filed on Nov. 27, 2019.

(51) Int. Cl.
*B01L 3/00* (2006.01)

(52) U.S. Cl.
CPC ... *B01L 3/50853* (2013.01); *B01L 2200/0684* (2013.01); *B01L 2200/0689* (2013.01); *B01L 2300/042* (2013.01); *B01L 2300/0803* (2013.01)

(58) Field of Classification Search
CPC ......... B01L 3/50853; B01L 2200/0684; B01L 2200/0689; B01L 2300/042; B01L 2300/0803; A61B 10/0096
See application file for complete search history.

(56) References Cited

U.S. PATENT DOCUMENTS

| | | | |
|---|---|---|---|
| 2,302,698 | A | 11/1942 | Kessel |
| 4,038,988 | A | 8/1977 | Perisse |

(Continued)

FOREIGN PATENT DOCUMENTS

| | | | |
|---|---|---|---|
| CN | 104583754 | A | 4/2015 |
| CN | 204489169 | U | 7/2015 |

(Continued)

OTHER PUBLICATIONS

International Search Report and Written Opinion of the International Searching Authority for International Patent Application No. PCT/US2020/062187 mailed May 18, 2021, 16 pages.

(Continued)

*Primary Examiner* — Jennifer Wecker
*Assistant Examiner* — Britney N. Washington
(74) *Attorney, Agent, or Firm* — Merchant & Gould P.C.

(57) ABSTRACT

A tissue holder cap for covering a tissue holder includes a cover having a perimeter, the cover having an outer surface and an inner surface opposite from the outer surface. The cover includes a central portion having an opening configured for receiving a central post of the tissue holder, a first latch extending from the perimeter of the cover, and a second latch extending from the perimeter of the cover, circumferentially spaced apart from the first latch. The cover also includes a first protrusion configured to engage the post of the tissue holder. When the first protrusion engages with the post, each of the first latch and the second latch automatically aligns with one or more of a plurality of tabs on located on a circumferential sidewall of the tissue holder to thereby securely fasten the tissue holder cap onto the tissue holder.

16 Claims, 13 Drawing Sheets

(56) References Cited

U.S. PATENT DOCUMENTS 4,134,012 A 1/1979 Smallbone et al.
4,306,570 A 12/1981 Matthews
4,549,554 A 10/1985 Markham
4,658,834 A 4/1987 Blankenship et al.
4,802,195 A 1/1989 Wojciechowski
4,803,639 A 2/1989 Steele
4,837,795 A 6/1989 Garrigus
4,852,560 A * 8/1989 Hermann, Jr. ..... A61B 10/0096 4/144.1
5,023,894 A 6/1991 Yamashita
5,023,895 A 6/1991 McCroskey
5,256,160 A 10/1993 Clement
5,427,742 A 6/1995 Holland
5,456,689 A 10/1995 Kresch et al.
5,491,344 A 2/1996 Kenny et al.
5,505,210 A 4/1996 Clement
5,526,822 A 6/1996 Burbank et al.
5,541,856 A 7/1996 Hammermeister
5,575,293 A 11/1996 Miller et al.
5,609,827 A 3/1997 Russell
5,754,621 A 5/1998 Suzuki
5,983,125 A 11/1999 Alfano et al.
6,017,316 A 1/2000 Ritchart et al.
6,032,673 A 3/2000 Savage et al.
6,058,159 A 5/2000 Conway
6,163,590 A 12/2000 Wilkins
6,207,111 B1 3/2001 Weinberg
6,225,107 B1 5/2001 Nagle
6,234,672 B1 5/2001 Tomasetti et al.
6,322,522 B1 11/2001 Zimmon
6,403,035 B1 6/2002 Caratsch et al.
6,485,436 B1 11/2002 Truckai et al.
6,535,284 B1 3/2003 Hajduk et al.
6,646,721 B2 11/2003 Compter
6,899,850 B2 5/2005 Haywood
7,166,113 B2 1/2007 Arambula
7,175,612 B2 2/2007 Felix et al.
7,397,894 B2 7/2008 Nakai
7,546,925 B1 6/2009 Zuk, Jr.
7,616,801 B2 11/2009 Gkanatsios et al.
7,662,109 B2 2/2010 Hibner
7,692,144 B2 4/2010 Watanabe
7,715,523 B2 5/2010 Lafferty
7,753,857 B2 7/2010 Hibner
7,758,601 B2 7/2010 Heywang-Koebrunner et al.
7,826,588 B2 11/2010 Eliasson
7,854,705 B2 12/2010 Pawluczyk et al.
7,856,081 B2 12/2010 Peschmann
7,858,038 B2 12/2010 Andreyko et al.
7,867,173 B2 1/2011 Hibner et al.
7,869,563 B2 1/2011 DeFreitas et al.
7,881,427 B2 2/2011 Kalender et al.
7,881,428 B2 2/2011 Jing et al.
7,972,062 B2 7/2011 Nicolosi
8,038,347 B2 10/2011 Manak
8,038,627 B2 10/2011 Hibner
8,050,735 B2 11/2011 Feke
8,052,616 B2 11/2011 Andrisek et al.
8,162,140 B2 4/2012 Hansen
8,177,728 B2 5/2012 Hibner et al.
8,213,570 B2 7/2012 Panesar
8,217,357 B2 7/2012 Stein et al.
8,235,913 B2 8/2012 Tibner et al.
8,284,896 B2 10/2012 Singh
8,532,745 B2 9/2013 DeFreitas et al.
8,565,374 B2 10/2013 DeFreitas et al.
8,702,623 B2 4/2014 Parihar
8,741,232 B2 6/2014 Baysal
8,764,679 B2 7/2014 Miller et al.
8,787,522 B2 7/2014 Smith et al.
8,838,207 B2 9/2014 Nakayama et al.
8,873,716 B2 10/2014 Ren et al.
8,911,381 B2 12/2014 Hibner et al.
8,923,603 B2 12/2014 Weston
8,956,306 B2 2/2015 Hibner
8,971,484 B2 3/2015 Beckmann
8,983,030 B2 3/2015 Ookawa
9,020,579 B2 4/2015 Smith et al.
9,066,706 B2 6/2015 DeFreitas et al.
9,068,920 B2 6/2015 Churilla
9,129,715 B2 9/2015 Adler
9,188,696 B2 11/2015 Schafer
9,234,855 B2 1/2016 Watanabe
9,277,895 B2 3/2016 Hara
9,322,790 B2 4/2016 Ookawa
9,326,755 B2 5/2016 Fiebig
9,329,139 B2 5/2016 Itou
9,341,546 B2 5/2016 Stuke
9,347,894 B2 5/2016 Sims
9,492,130 B2 11/2016 Flagle et al.
9,498,175 B2 11/2016 Stein et al.
9,549,709 B2 1/2017 DeFreitas et al.
9,642,581 B2 5/2017 Lowe
9,668,711 B2 6/2017 Smith et al.
9,733,167 B2 8/2017 Wismueller
9,750,484 B2 9/2017 Finke et al.
9,861,327 B2 1/2018 Yasuda et al.
9,865,424 B2 1/2018 Keda
9,901,320 B2 2/2018 DeFreitas et al.
9,943,850 B2 4/2018 Purdy
9,953,799 B2 4/2018 Hakoda
10,008,298 B2 6/2018 King
10,010,296 B2 7/2018 Basu
10,078,093 B2 9/2018 Flagle
10,098,216 B2 10/2018 Kabumoto
10,105,709 B2 10/2018 Purdy
10,145,806 B2 12/2018 Tanaka
10,190,997 B2 1/2019 Aoki
10,194,875 B2 2/2019 DeFreitas et al.
10,201,331 B2 2/2019 Fleming
10,322,412 B2 6/2019 Purdy
10,393,678 B2 8/2019 Watanabe
10,488,351 B2 11/2019 Butani
10,489,964 B2 11/2019 Wang
10,542,951 B2 1/2020 Klausz et al.
10,561,387 B2 2/2020 Smith et al.
10,631,809 B2 4/2020 Noh
10,705,030 B2 7/2020 Watanabe
10,709,396 B2 7/2020 Lou
10,729,403 B2 8/2020 DeFreitas et al.
10,753,836 B2 8/2020 O'Driscoll
10,792,003 B2 10/2020 Smith et al.
10,809,208 B2 10/2020 Yashima
10,827,989 B2 11/2020 Vancamberg et al.
10,905,385 B2 2/2021 DeFreitas et al.
11,083,426 B2 8/2021 DeFreitas
11,191,502 B2 12/2021 Smith et al.
11,246,551 B2 2/2022 Butani
11,478,206 B2 10/2022 Smith et al.
11,617,548 B2 4/2023 DeFreitas et al.
2002/0007188 A1 1/2002 Arambula
2002/0145722 A1 10/2002 Compter
2002/0193656 A1 12/2002 Ravins et al.
2003/0087423 A1 5/2003 Haywood
2003/0216730 A1 11/2003 Barry et al.
2004/0022350 A1 2/2004 Gregerson et al.
2004/0174031 A1 9/2004 Rasmussen
2004/0218716 A1 11/2004 Freifeld
2005/0051723 A1 3/2005 Neagle et al.
2005/0065453 A1 3/2005 Shabaz et al.
2005/0112034 A1 5/2005 McCormick
2005/0124913 A1 6/2005 Damarati
2005/0148842 A1 7/2005 Wang
2006/0074343 A1 4/2006 Hibner
2006/0116603 A1 6/2006 Shibazaki et al.
2006/0173266 A1 8/2006 Pawluczyk et al.
2007/0106176 A1 5/2007 Mark et al.
2007/0116612 A1 5/2007 Williamson
2007/0166834 A1 7/2007 Williamson, IV et al.
2007/0237684 A1 10/2007 Hansen
2007/0239067 A1 10/2007 Hibner et al.
2007/0270714 A1 11/2007 Cushner et al.
2008/0004545 A1 1/2008 Garrison

(56) References Cited

U.S. PATENT DOCUMENTS

| | | | |
|---|---|---|---|
| 2008/0082021 | A1* | 4/2008 | Ichikawa ........... A61B 10/0096 600/104 |
| 2008/0132805 | A1 | 6/2008 | Heywang-Koebrunner et al. |
| 2008/0137935 | A1 | 6/2008 | Spahn |
| 2008/0214955 | A1 | 9/2008 | Speeg et al. |
| 2008/0221480 | A1 | 9/2008 | Hibner et al. |
| 2008/0228103 | A1 | 9/2008 | Ritchie et al. |
| 2008/0249434 | A1 | 10/2008 | Hashimshony et al. |
| 2009/0088663 | A1 | 4/2009 | Miller et al. |
| 2009/0088666 | A1 | 4/2009 | Miller et al. |
| 2009/0131818 | A1 | 5/2009 | Speeg et al. |
| 2009/0131820 | A1 | 5/2009 | Speeg |
| 2009/0131823 | A1 | 5/2009 | Andreyko et al. |
| 2009/0171243 | A1 | 7/2009 | Hibner et al. |
| 2009/0171244 | A1 | 7/2009 | Ning |
| 2009/0213987 | A1 | 8/2009 | Stein |
| 2010/0080346 | A1 | 4/2010 | Kalender et al. |
| 2010/0081964 | A1 | 4/2010 | Mark |
| 2010/0152611 | A1 | 6/2010 | Parihar |
| 2010/0160824 | A1 | 6/2010 | Parihar |
| 2010/0160826 | A1 | 6/2010 | Parihar |
| 2010/0191145 | A1 | 7/2010 | Lafferty |
| 2010/0317997 | A1 | 12/2010 | Hibner |
| 2011/0123074 | A1 | 5/2011 | Nie |
| 2011/0142201 | A1 | 6/2011 | Eberhard et al. |
| 2011/0285837 | A1 | 11/2011 | Bello |
| 2012/0014504 | A1 | 1/2012 | Jang et al. |
| 2012/0051514 | A1 | 3/2012 | Sims et al. |
| 2012/0053484 | A1 | 3/2012 | Parks |
| 2012/0065542 | A1 | 3/2012 | Hibner et al. |
| 2012/0116246 | A1 | 5/2012 | Hibner |
| 2012/0123295 | A1 | 5/2012 | Sanbuichi |
| 2012/0245485 | A1 | 9/2012 | Hibner |
| 2013/0053724 | A1 | 2/2013 | Fiebig |
| 2013/0101089 | A1 | 4/2013 | Cho |
| 2013/0231585 | A1* | 9/2013 | Flagle .................. A61B 6/4405 600/565 |
| 2014/0039343 | A1 | 2/2014 | Mescher |
| 2014/0051986 | A1 | 2/2014 | Zhao et al. |
| 2014/0065656 | A1 | 3/2014 | Baysal |
| 2014/0072104 | A1 | 3/2014 | Jacobsen et al. |
| 2014/0198893 | A1 | 7/2014 | Badawi et al. |
| 2014/0257135 | A1 | 9/2014 | DeFreitas |
| 2014/0276209 | A1 | 9/2014 | Hibner |
| 2015/0083893 | A1 | 3/2015 | Wismueller |
| 2015/0131773 | A1 | 5/2015 | Lowe et al. |
| 2015/0209017 | A1* | 7/2015 | Fleming ................... G01N 1/00 73/864.91 |
| 2016/0073988 | A1 | 3/2016 | Nagai |
| 2016/0151054 | A1 | 6/2016 | An |
| 2016/0211045 | A1 | 7/2016 | Jeon et al. |
| 2017/0131311 | A1 | 5/2017 | Flagle |
| 2017/0309063 | A1 | 10/2017 | Wang |
| 2017/0336706 | A1 | 11/2017 | Wang |
| 2018/0168523 | A1 | 6/2018 | Vancamberg et al. |
| 2018/0249985 | A1 | 9/2018 | DeFreitas et al. |
| 2019/0054217 | A1 | 2/2019 | Axon |
| 2019/0072463 | A1 | 3/2019 | O'Driscoll |
| 2019/0130563 | A1 | 5/2019 | Vecchio et al. |
| 2019/0167869 | A1 | 6/2019 | Willard |
| 2019/0195754 | A1* | 6/2019 | Keller ................ A61B 10/0096 |
| 2019/0269376 | A1 | 9/2019 | Butani |
| 2019/0285558 | A1 | 9/2019 | DeFreitas |
| 2019/0346471 | A1 | 11/2019 | Flagle |
| 2020/0029927 | A1 | 1/2020 | Wilson et al. |
| 2020/0061622 | A1 | 2/2020 | Purdy |
| 2020/0085393 | A1 | 3/2020 | Zhang et al. |
| 2020/0160522 | A1 | 5/2020 | Merlo |
| 2020/0187923 | A1 | 6/2020 | Safir |
| 2020/0268331 | A1 | 8/2020 | Purdy |
| 2020/0352543 | A1 | 11/2020 | DeFreitas et al. |
| 2020/0386657 | A1 | 12/2020 | O'Driscoll |
| 2022/0015729 | A1 | 1/2022 | Purdy et al. |
| 2022/0015731 | A1 | 1/2022 | Liu |
| 2022/0110597 | A1* | 4/2022 | Chen .................... A61B 6/5247 |
| 2022/0133252 | A1 | 5/2022 | Smith et al. |
| 2022/0331808 | A1 | 10/2022 | Purdy |
| 2023/0014922 | A1 | 1/2023 | DeFreitas |
| 2023/0121010 | A1 | 4/2023 | Smith et al. |
| 2023/0172572 | A1 | 6/2023 | Bumdra |
| 2023/0355200 | A1 | 11/2023 | Ren |
| 2024/0016461 | A1 | 1/2024 | Wolff |
| 2024/0219276 | A1 | 7/2024 | DeFreitas |
| 2024/0315676 | A1 | 9/2024 | Chen |
| 2024/0359187 | A1 | 10/2024 | Purdy |
| 2025/0166798 | A1 | 5/2025 | Tripathi |

FOREIGN PATENT DOCUMENTS

| | | | |
|---|---|---|---|
| CN | 110023994 | A | 7/2019 |
| CN | 110393553 | A | 11/2019 |
| DE | 20 2019 106 995 | | 1/2020 |
| EP | 2277445 | | 1/2011 |
| EP | 2007287 | | 6/2016 |
| EP | 3143937 | | 3/2017 |
| GB | 2018601 | | 10/1979 |
| JP | 2006-346179 | | 12/2006 |
| JP | 2014-526937 | | 10/2014 |
| JP | 2015-085056 | | 5/2015 |
| JP | 2015-520402 | | 7/2015 |
| JP | 2016-154878 | | 9/2016 |
| JP | 2017099928 | | 6/2017 |
| JP | 6320717 | B2 | 5/2018 |
| WO | 8101363 | | 5/1981 |
| WO | 2007021905 | | 2/2007 |
| WO | 2008/025146 | | 3/2008 |
| WO | 2009/120206 | | 10/2009 |
| WO | 2010/028208 | | 3/2010 |
| WO | 2011/140374 | | 11/2011 |
| WO | 2012/074885 | | 6/2012 |
| WO | 2013/166497 | | 11/2013 |
| WO | 2017/060726 | | 4/2017 |
| WO | 2018/183086 | | 10/2018 |
| WO | 2018/204710 | | 11/2018 |
| WO | 2019/051496 | | 3/2019 |
| WO | 2019/085342 | | 5/2019 |
| WO | 2019/216766 | A1 | 11/2019 |
| WO | 2020/106888 | | 5/2020 |
| WO | 2021/202455 | | 10/2021 |

OTHER PUBLICATIONS

Basak Erguvan-Dogan et al., "Specimen Radiography in Confirmation of MRI-Guided Needle Localization and Surgical Excision of Breast Lesions", American Journal of Roentgenology, American Roentgen Ray Society, vol. 187, No. 2: 339-344 (2006).

PCT International Preliminary Report on Patentability in Application PCT/US2020/062187, mailed Jun. 9, 2022, 12 pages.

Watanabe, M. et al., "The quantitative analysis of thin specimens: a review of progress from the Cliff-Lorimer to the new zeta-factor methods", Journal of Microscopy, vol. 221, No. 2, Feb. 1, 2006, p. 91.

European Extended Search Report in Application 26162563.6, mailed May 20, 2026, 9 pages.

* cited by examiner

TISSUE HOLDER ASSEMBLY AND COMPONENTS THEREOF

RELATED APPLICATION DATA

This application is a National Stage Application of PCT/US2020/062187, filed on Nov. 25, 2020, which claims the benefit of priority under 35 U.S.C. § 119 to U.S. Provisional Application Ser. No. 62/941,194, filed on Nov. 27, 2019, the disclosures of which are hereby incorporated by reference in their entireties. To the extent appropriate, a claim of priority is made to each of the above disclosed applications.

FIELD

This disclosure generally relates to devices and methods for handling biopsy tissue specimens for imaging, and for storing such biopsy tissue specimens.

BACKGROUND

Biopsies are well-known medical procedures involving the removal of tissue from a living body and examining the tissue for diagnostic study, such as determining the presence, cause or extent of a disease. For example, a biopsy of human breast tissue may be performed for diagnosing breast cancer or other diseases. In general, a biopsy can be performed by either an open procedure or a percutaneous method. An open surgical biopsy procedure involves making an open incision to the site of the tissue of interest, cutting a sample of the tissue, and removing the tissue through the open incision. A percutaneous biopsy is performed by inserting a biopsy device having a needle and a cutting device through a small incision and advancing the needle and cutting device to the site of the tissue of interest. Then, the cutting device cuts a sample of tissue, and the biopsy device captures the tissue sample and removes the sample through the small incision. Percutaneous biopsy devices have used various means to remove the tissue sample, such as simply removing the device out through the incision with the captured tissue sample, or transporting the tissue sample out through the device (e.g.; using a vacuum to aspirate the sample) where it can be removed or drawn through a tube to a container. One advantage of removing the tissue sample from the biopsy device is that multiple samples may be taken without having to remove the biopsy device.

The tissue sample is then examined for diagnosis by imaging the tissue sample using X-ray (while previous X-ray imaging systems recorded on film; more recent X-ray imaging system are digital and record using semiconductor receptors), MRI (magnetic resonance imaging) or other suitable imaging device. For instance, the tissue sample may be placed on an imaging substrate, such as a tissue slide or film, and then placed into the imaging device for taking an image.

Automated biopsy and imaging systems for performing a biopsy and imaging a tissue sample have also been disclosed. For example, U.S. Pat. No. 9,492,130 B2 discloses an integrated biopsy analysis system having a biopsy excision tool, a tissue sample transport mechanism for automatically transporting an excised tissue sample from the biopsy excision tool to an analysis/imaging unit, and an analysis/imaging system for automatically analyzing tissue samples such as imaging using an X-ray imaging device. U.S. Pat. No. 9,492,130 B2 is hereby incorporated by reference herein in its entirety. The disclosed system excises tissue samples, and transfers and places the excised tissue samples into a specimen holder having a plurality of tissue accepting slots for placing a plurality of different tissue samples. The imaging unit is configured to acquire images of the tissue samples in the tissue holder, such as by acquiring individual images of each tissue sample in its respective tissue accepting slot.

In some cases, it may be desirable to store the tissue samples after imaging is completed. For example, after imaging is performed, it may be desirable to transfer the tissue samples to a pathology lab for further analysis and storage. As such, effective and efficient apparatus and methods for transporting the tissue samples that retain each sample in its respective tissue accepting slot of the tissue holder is also desirable.

SUMMARY

A tissue holder cap for covering a tissue holder, the tissue holder having a bottom, a circumferential sidewall extending upward from the bottom, a hub, a post extending upward from the hub, and a plurality of dividing walls extending radially outward from the hub to define a plurality of tissue storage compartments, the tissue hold cap including a cover having a perimeter, the cover having an outer surface and an inner surface opposite from the outer surface, wherein a central portion of the cover comprises an opening configured for receiving the post of the tissue holder; a first latch extending from the perimeter of the cover; and a second latch extending from the perimeter of the cover, circumferentially spaced apart from the first latch; wherein the cover includes a first protrusion configured to engage the post of the tissue holder, and wherein when the first protrusion engages with the post, each of the first latch and the second latch automatically aligns with one or more of a plurality of tabs located on the circumferential sidewall of the tissue holder to thereby securely fasten the tissue holder cap onto the tissue holder Optionally, the tissue holder comprises a rim, wherein the cover of the tissue holder cap comprises a sealing portion extending around a circumference of the cover, the sealing portion having a bottom face for abutment against the rim of the tissue holder, and wherein the inner surface of the cover is recessed relative to the bottom face of the sealing portion.

Optionally, the post of the tissue holder comprises a first recess, and the first protrusion of the tissue holder cap is configured for placement in the first recess when the protrusion engages with the post.

Optionally, the cover includes a second protrusion, wherein the post of the tissue holder comprises a first recess and a second recess, and wherein the first protrusion and the second protrusion are configured for respectively mating with the first and second recesses of the post of the tissue holder.

Optionally, the first protrusion and the second protrusion are on opposite sides of the opening of the cover.

Optionally, the first latch is radially aligned with the first protrusion and/or elastically moveable relative to the cover.

Optionally, the tissue holder cap further includes a first finger-tab extending from the first latch, wherein the first finger-tab is configured to move the first latch for detaching the tissue holder cap with respect to the tissue holder.

Optionally, the tissue holder cap further includes a stopper configured to prevent over-flexing of the first finger-tab.

Optionally, the first latch is configured to anchor against the bottom of the tissue holder.

Optionally, the first latch is configured to anchor against one of the tabs, and wherein the first latch comprises a latch opening configured to accommodate the one of the tabs.

Optionally, the first latch comprises a first anchor and a second anchor configured to simultaneously anchor against adjacent tabs of the plurality of tabs.

Optionally, the cover comprises a plurality of vent holes located between the perimeter of the cover and the opening of the cover.

Optionally, at least one of the vent holes has a cross-sectional dimension that is 0.03 inch or less.

Optionally, at least one of the vent holes has a cross sectional dimension that increases along a thickness of the cover.

Optionally, a number of the vent holes increases as a function of distance from the opening.

A tissue storage system includes the tissue holder cap, and the tissue holder.

Optionally, the post of the tissue holder comprises a first recess, and wherein each adjacent pair of the tabs of the tissue holder define a space therebetween, and wherein the space or one of the tabs is radially aligned with the first recess of the post of the tissue holder.

A tissue holder includes: a bottom with a filter; a circumferential sidewall extending upward from the bottom; a hub having a cavity; a plurality of dividing walls extending from the hub to define a plurality of tissue storage compartments; a post extending upward from the hub; and a channel extending from the cavity of the hub into the post, wherein the channel is off-center with respect to the post.

A tissue storage system includes the tissue holder, and a tissue holder cap configured to securely fasten onto the tissue holder.

Optionally, the tissue holder cap comprises: a cover having a perimeter and an opening at a center of the cover, wherein the cover has an outer surface and an inner surface opposite from the outer surface; a first latch; and a second latch, wherein the second latch is circumferentially spaced apart from the first latch.

Optionally, the first latch is configured to anchor against a first tab at the circumferential sidewall of the tissue holder, and the second latch is configured to anchor against a second tab at the circumferential sidewall of the tissue holder.

Optionally, the first latch is configured to anchor against a first pair of tabs at the circumferential sidewall of the tissue holder, and the second latch is configured to anchor against a second pair of tabs at the circumferential sidewall of the tissue holder.

Optionally, the first latch is configured to anchor against the bottom of the tissue holder.

A method of handling tissue samples, includes: receiving the tissue samples by a tissue holder having a plurality of tissue storage compartments, a hub, and a post extending from the hub, wherein the act of receiving the tissue samples is performed while the tissue holder is moveably located within a tissue holder assembly; receiving a first protrusion of a tissue holder cap, by a recess at the post of the tissue holder, to align a first latch of the tissue holder cap with a first part of the tissue holder and to align a second latch of the tissue holder cap with a second part of the tissue holder; and securely attaching the tissue holder cap onto the tissue holder to retain the tissue samples within the tissue storage compartments of the tissue holder, wherein the act of securely attaching is performed by the first latch and the second latch of the tissue holder cap anchoring against the tissue holder.

Optionally, the first part of the tissue holder comprises a first tab at a circumferential sidewall of the tissue holder, and the second part of the tissue holder comprises a second tab at the circumferential sidewall of the tissue holder.

Optionally, the first part of the tissue holder comprises a first pair of tabs at a circumferential sidewall of the tissue holder, and the second part of the tissue holder comprises a second pair of tabs at the circumferential sidewall of the tissue holder.

Optionally, the first part of the tissue holder comprises a first bottom part of the tissue holder, and the second part of the tissue holder comprises a second bottom part of the tissue holder.

Other and further aspects and features will be evident from reading the following detailed description.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

DETAILED DESCRIPTION

Figure 1:
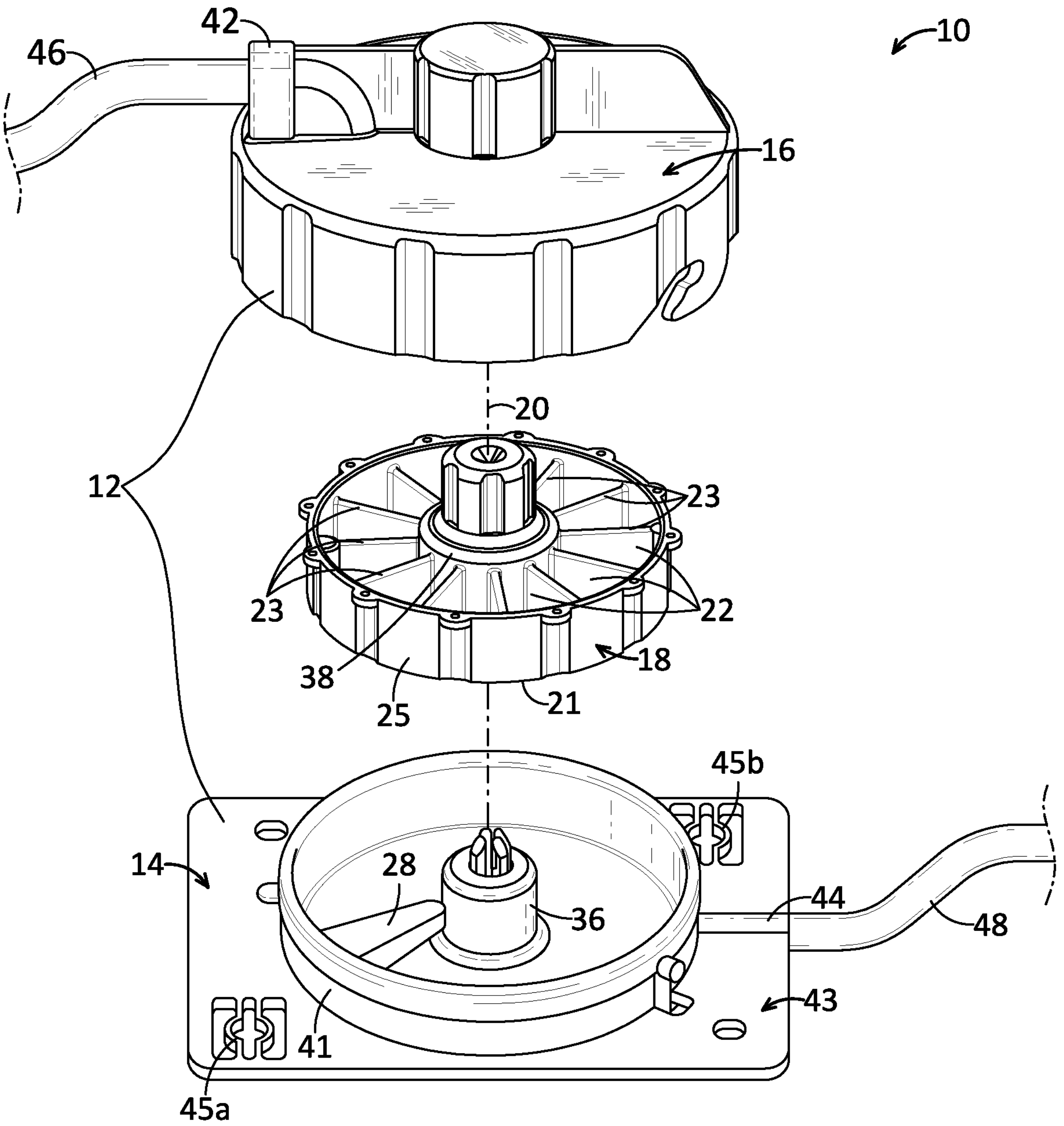
FIG. 1 illustrates a tissue holder assembly having a base, a tissue holder assembly cover, and a tissue holder.

Various embodiments are described hereinafter with reference to the figures. It should be noted that the figures are not drawn to scale and that elements of similar structures or functions are represented by the same reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 2:
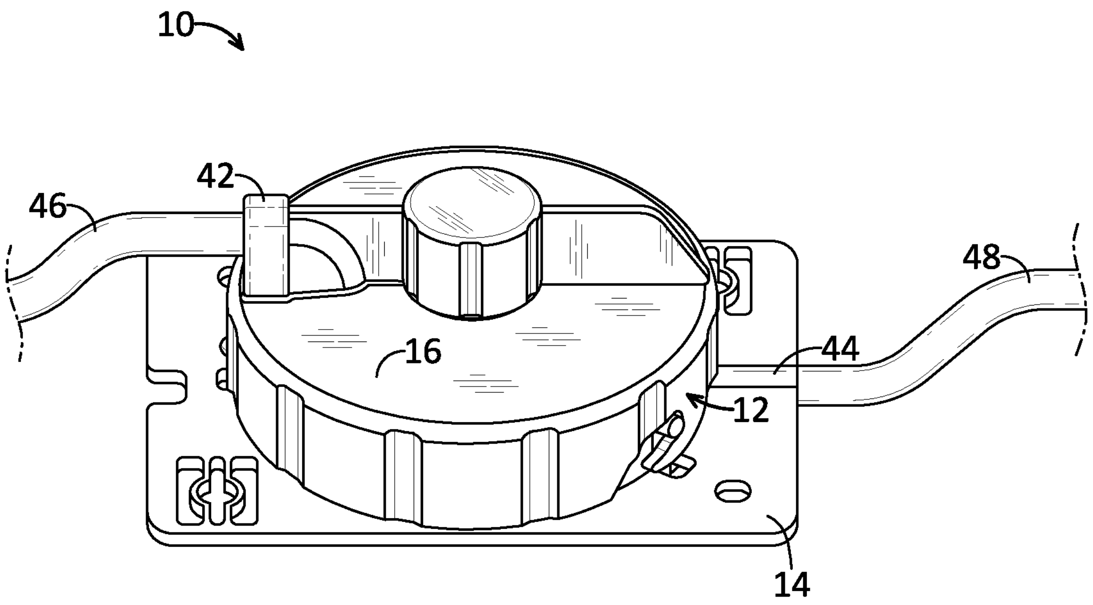
FIG. 2 illustrates the tissue holder assembly of FIG. 1 as assembled.
Figure 3:
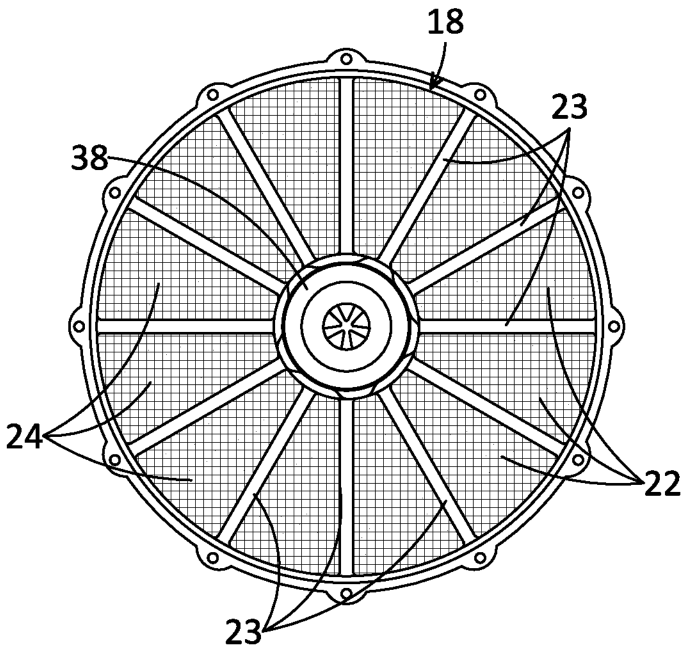
FIG. 3 is a top view of the tissue holder of the tissue holder assembly of FIGS. 1 and 2.

FIGS. 1-3 illustrate one embodiment of a tissue holder assembly 10 for receiving a plurality of tissue samples. The tissue holder assembly 10 includes a housing 12 having a base 14 and a cover 16 which removably attaches onto the base 14. The base 14 and attached cover 16 form an interior or chamber in which a tissue holder 18 is enclosed. The base 14 has a spindle 36 which receives a hub 38 of the tissue holder 18, such that the tissue holder 18 is rotatable relative to the housing 12 about an axis 20. In other words, the base 14 and cover 16 remain stationary and the tissue holder 18 rotates within the chamber formed by the base 14 and cover 16. The tissue holder 18 may be rotated using any suitable actuator, and may include a magnet that is detected by a hall effect sensor to identify when the tissue filter is in a home position.

The base 14 has a bottom member 43 and a cylindrical sidewall 41 extending upward from the bottom member 43. The bottom member 43 may comprise a substantially flat plate. The bottom member 43 has a plurality of retaining clips 45*a*, 45*b* which removably attach to mating retainers on a chassis, frame, housing, or the like, of a tissue biopsy system 50 (see FIG. 1). A spindle 36 is attached to the bottom member 43 and extends upward from the bottom member 43. The tissue holder 18 has a bottom 21 and a circumferential sidewall 25 extending upward from the bottom 21. As shown in FIG. 3, the tissue holder 18 also has a plurality of tissue storage compartments 22 (in this case, the tissue holder 18 has thirteen tissue storage compartments 22, but any number of compartments 22 can be used) arranged angularly around the tissue holder 18. The tissue storage compartments 22 are defined by radial dividing walls 23 extending radially from the hub 38 to the sidewall 25. The tissue storage compartments 22 (also referred to as tissue containers 22) are separated, and partially formed, by radially extending compartment walls 23. In this exemplary embodiment, the tissue holder 18 has a circular shape such that the tissue storage compartments 22 are wedge-shaped (i.e., pie-shaped, sector of a circle), or a sector of an annulus shape in the case that the central part of each tissue storage compartment 22 does not extend all the way to the axis 20. The tissue containers 22 connect to a hub 38 of the tissue holder 18 that is centrally located at the axis 20. The hub 38 is circular and has an opening that allows the spindle 36 of the base 14 to fit through the opening.

The bottom 21 of the tissue holder 18 comprises a tissue filter 24 having a porous filter material. The tissue filter 24 may be a single filter, such as a filter sheet, which covers the entire bottom of the tissue holder 18. Alternatively, the tissue filter 24 may be individual filters disposed on the bottom of each tissue storage compartment 22. A fluid removal mechanism 28 is disposed in the interior formed by the base 14 and the cover 16. The fluid removal mechanism 28 is configured for removing fluid from the filter 24 underlying the bottom of a plurality of tissue storage compartments 22 in order to improve the quality of images acquired of tissue samples in the tissue storage compartments. The fluid removal mechanism 28 may be attached to the bottom member 43 and is located underneath the tissue holder 18.

The fluid removal mechanism 28 may be any device configured to remove fluid from the bottom of the tissue holder 18. In some embodiments, the fluid removal mechanism 28 may be a fluid reservoir configured to remove fluid at the bottom surface of the filter 24. In other embodiments, the fluid removal mechanism 28 may be a gas nozzle directed at the bottom surface of the filter 24. The gas nozzle may be configured to direct gas (e.g., air) flow across the tissue storage compartments 22. The gas flow removes fluid stuck to the bottom surface of the filter 24. In further embodiments, the fluid removal mechanism 28 may be a suction device. In other embodiments, the tissue holder assembly 10 may not include the fluid removal mechanism 28.

The base 14 has a spindle 36. The spindle 36 of the base 14 rotatably receives a hub 38 of the tissue holder 18 such that the tissue holder 18 may rotate relative to the base 14.

The tissue holder assembly 10 has a tissue sample entry port 42 (also referred to as inlet port 42) on the cover 16 to which an inlet tube 46 is connected (see FIG. 1). The other end of the inlet tube 46 is connected to a biopsy excision tool 60 (see FIG. 1) such that tissue samples excised by the biopsy excision tool 60 are transported from the biopsy excision tool 60 through the inlet tube 46, into the tissue holder assembly 10 and into one of the tissue storage compartments 22. The tissue holder assembly 10 has an outlet port 44 (also referred to as a vacuum port 44) on the base 14 to which a suction tube 48 is connected. The outlet port 44 extends from outside the interior of the housing 12 into the interior, such as through the sidewall 41. The other end of the suction tube 48 is connected to the suction canister 62 or another suitable vacuum source. The vacuum port 44 draws liquid and/or other material out of the base, and also provides a vacuum within the chamber formed by the housing 12 for drawing tissue samples through the inlet port 42 to be deposited in the respective tissue storage compartments 22 of the tissue holder 18.

Figure 4:
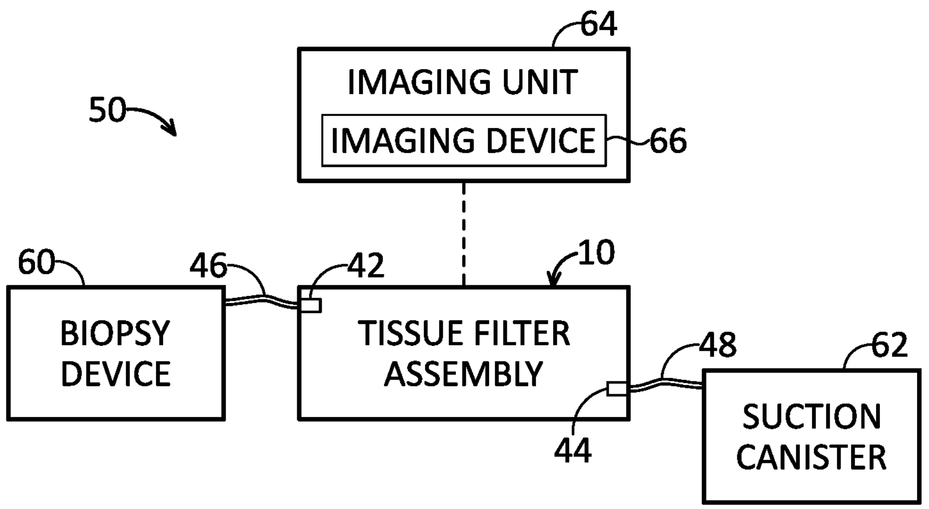
FIG. 4 is a schematic view of a biopsy system including the tissue holder assembly of FIG. 1.

Referring to FIG. 4, a schematic of a tissue biopsy system 50 is shown. While the schematic of FIG. 4 only shows certain features of the biopsy system 50, the biopsy system 50 may be the biopsy system as disclosed in U.S. Pat. No. 9,492,130 B2, referenced above, and may include any of the features disclosed therein. The biopsy system 50 includes the tissue holder assembly 10, attached to a biopsy excision tool 60 and a suction canister 62. The biopsy system 50 also includes an imaging unit 64 configured to capture images of tissue samples contained in each of the tissue storage compartments 22. The imaging unit 64 has an imaging device 66, such as an X-ray imaging device 66, or other suitable imaging device for capturing images. The imaging device 66 has an imaging field in which the imaging device 66 can acquire an image of material positioned in the imaging field.

Figure 5:
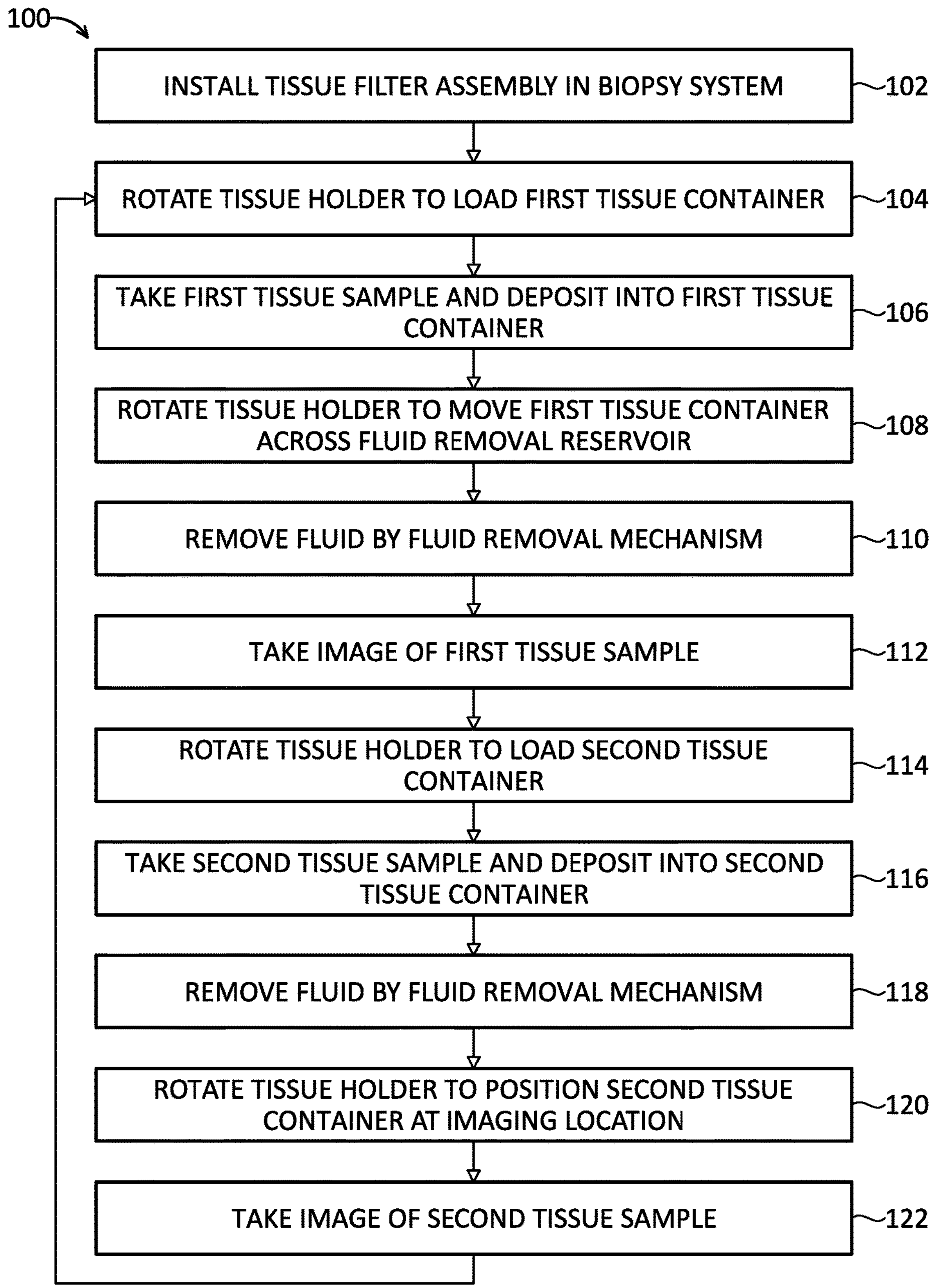
FIG. 5 illustrates a flow chart of a method for using and/or operating the tissue holder assembly of FIG. 1.

With reference to FIG. 5, a method 100 of using and operating the tissue holder assembly 10 will now be described. At item 102, the tissue holder assembly 10 is installed into an automated biopsy system 50, such as a system as described in U.S. Pat. No. 9,492,130 B2, described above, with the biopsy excision tool 60 connected to the inlet tube 46, and a vacuum source connected to the suction tube 48. The tissue holder assembly 10 or just the tissue holder 18 (e.g., a tissue holder 18 may be installed into the tissue holder assembly which is installed in the system 50) may be manually installed in the automated biopsy system 50, or the system 50 may include a robot which is configured to automatically install the tissue holder assembly 10 or just the tissue holder 18 into the system 50.

At item 104, the tissue holder 18 is rotated to position a first tissue storage compartment 22 at a loading position of the tissue filter holder 18 such that a tissue sample transported through the inlet port 42 will be deposited into the first tissue storage compartment 22 of the tissue holder 18.

At item 106, a first tissue sample is excised using the biopsy excision tool 62, and the first tissue sample is transported through the inlet tube 46 and inlet port 42 and is deposited into the first tissue storage compartment 22 of the tissue holder 18.

At item 108, the tissue holder 18 is rotated such that the bottom surface of the filter 24 underlying the first tissue storage compartment 22 moves across the fluid removal mechanism 28 with the bottom surface of the filter 24 contacting the fluid removal mechanism 28 to thereby remove fluid remnants accumulated on the bottom surface of the filter 24 underlying the first tissue storage compartment 22.

At item 110, the first tissue storage compartment 22 is positioned in the imaging field of the imaging unit 64 to acquire an image of the first tissue sample in the first tissue storage compartment 22. The imaging field may be located just past the fluid removal mechanism 28 in the direction of the movement of the first tissue storage compartment 22 in item 108 such that the first tissue storage compartment 22 is positioned in the imaging field by the movement of the tissue holder 18 in item 108.

At item 112, an image of the first tissue sample is acquired using the imaging unit 64.

At item 114, the tissue holder 18 is rotated to position a second tissue storage compartment 22 at the loading position of the tissue holder 18 such that a tissue sample transported through the inlet port 42 can be deposited into the second tissue storage compartment 22. This positioning may occur during the same movement as item 108 and/or 110. In other words, as the first tissue storage compartment 22 is moved across the fluid removal mechanism 28, the second tissue storage compartment 22 may be positioned at the loading position.

At item 116, a second tissue sample is excised using the biopsy excision tool 60, and the second tissue sample is transported through the inlet tube 46 and inlet port 42 and is deposited into the second tissue storage compartment 22 of the tissue holder 18.

At item 118, the tissue holder 18 is rotated such that the bottom surface of the filter 24 underlying the second tissue storage compartment 22 moves across the fluid removal mechanism 28 with the bottom surface of the filter 24 contacting the fluid removal mechanism 28 to thereby remove fluid remnants accumulated on the bottom surface of the filter 24 of the second tissue storage compartment 22.

At item 120, the second tissue storage compartment 22 is positioned in the imaging field for the imaging unit 64 to acquire an image of the second tissue sample in the second tissue storage compartment 22. Again, the imaging field may be located just past the fluid removal mechanism 28 in the direction of the movement of the second container 22 in item 118 such that the second tissue storage compartment 22 is positioned in the imaging field by the movement of the tissue holder 18 in item 118.

At item 122, an image of the second tissue sample is acquired using the imaging unit 64. The process is repeated until all of the desired tissue samples have been obtained, deposited into a tissue storage compartment 22 and images have been acquired for all of the respective tissue samples in each of the tissue storage compartments 22.

Alternatively, images of the tissue samples in the tissue storage compartments 22 may be acquired after all the samples are acquired. First, all of the tissue samples are obtained and deposited into respective tissue storage compartments 22 by rotating each tissue storage compartment 22 to the loading position, excising a tissue sample, and depositing the tissue sample into its respective tissue storage compartment 22. Then, the tissue holder 18 is rotated to remove the fluid from each of the tissue containers 22 in the tissue holder 18 and the tissue samples in the tissue holder assembly 10 are imaged. The tissue samples may be imaged all at once by taking a single image of all the tissue containers 22 in the tissue holder 18, processing the image to identify the individual containers 22 and separating each image from each container 22. Alternatively, the tissue holder 18 may be rotated to acquire a separate image of each of the containers until images have been taken of all of the respective tissue samples in each of the tissue containers 22. In yet another embodiment, the tissue holder assembly 10 is placed in an imaging unit, such as an X-ray imaging device. In a manual system, the filter assembly 10 may be manually installed in the imaging unit 54.

In an automated and integrated system such as the system described above, the tissue holder assembly 10 is already located in the imaging unit 64 while performing the biopsy excisions, or a robot may place the tissue holder assembly 10 in the imaging unit 64. The tissue holder 18 is then rotated to move a tissue storage compartment 22 across the fluid removal mechanism 28, the tissue storage compartment 22 is positioned in the imaging position, and an image is acquired using the imaging unit 64. This process is repeated for each of the tissue storage compartments 22 having a tissue sample to be imaged.

Once the biopsy has been completed, the tissue samples are transported to a pathology lab for further analysis. This is accomplished by removing the tissue holder assembly 10 from the system 50 and detaching the cover 16 of the tissue holder assembly 10 in order to gain access to the tissue holder 18. Tissue holder 18 may then be removed from the tissue holder assembly 10 and placed into a specimen jar filled with formalin for transport. In some embodiments, tissue holder 18 may be capped or covered with a tissue holder cap to retain the tissue samples within the tissue storage compartments 22 and limit the movement or migration of the tissue samples between adjacent tissue storage compartments 22 during transport.

Figure 6A:
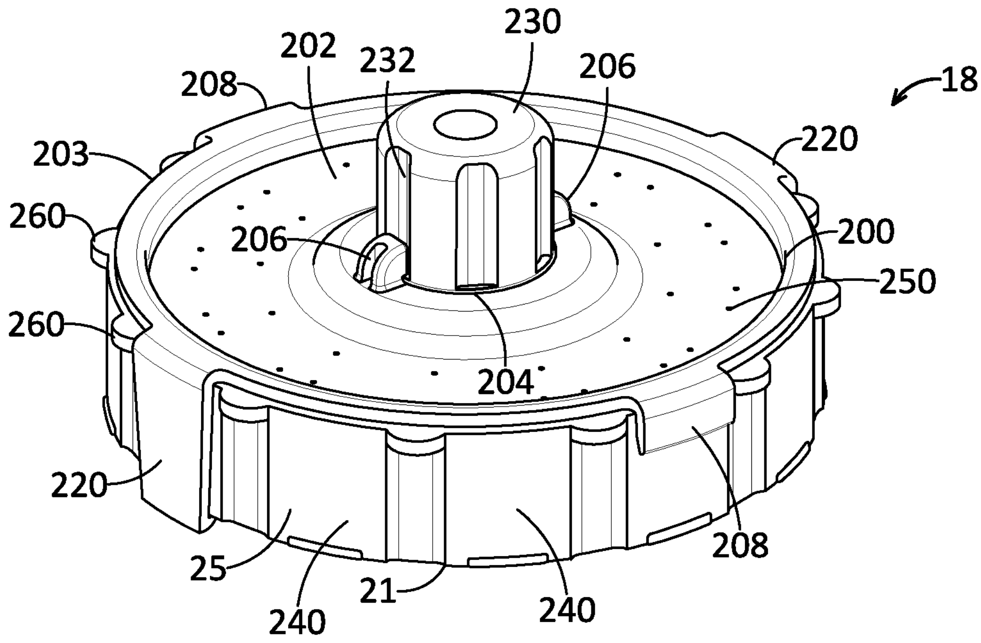
FIGS. 6A-6B illustrate a tissue holder cap for covering a tissue holder according to some embodiments.
Figure 6B:
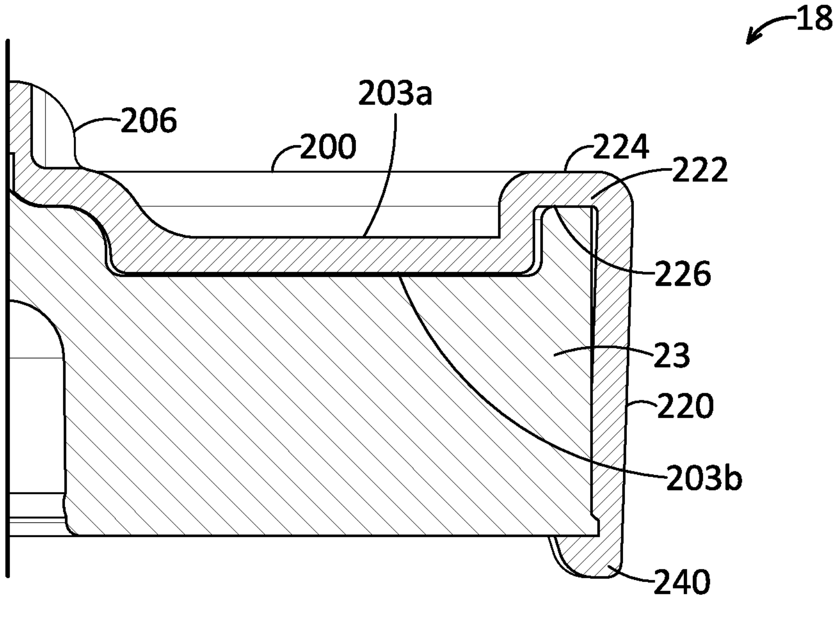

FIGS. 6A-6B illustrate a tissue holder cap 200 for covering the tissue holder 18 according to some embodiments. As shown in the figures (as well as in FIGS. 1 and 3), the tissue holder 18 has a bottom 21 with a filter 24, a circumferential sidewall 25 extending upward from the bottom 21, a hub 38, a post 230 extending upward from the hub 38, and a plurality of dividing walls 23 extending from the hub 38 to define a plurality of tissue storage compartments 22. In the illustrated embodiments, the tissue holder cap 200 removably attaches onto the tissue holder 18, such as by attaching to the sidewall 25 of the tissue holder 18. Tissue holder cap 200 is configured to correspond with a shape of tissue holder 18 to seal tissue holder 18. For example, in an exemplary embodiment, the tissue holder cap 200 includes a cover 202 (which is different than cover 16 described above) having an outer sealing portion 203 and a central portion defining an opening 204 to receive the post 230 of the tissue holder 18. Cover 202 encloses the tissue storage compartments 22 to retain tissue samples within the tissue storage compartments 22 when tissue holder cap 200 is secured onto tissue holder 18 and tissue holder 18 is transported to the pathology lab. The cover 202 has an outer surface 203*a* and an inner surface 203*b* opposite from the outer surface 203*a*. The tissue holder cap 200 also includes a first latch 220 and a second latch 220 circumferentially spaced apart from each other. In the exemplary embodiment, the first latch 220 and the second latch 220 are radially aligned with each other. In other embodiments, the first and second latches 220 may not radially align with each other. Also, as shown in the illustrated embodiments, the latches 220 extend from the perimeter of the cover 202. As explained in more detail below, the first latch 220 and the second latch 220 are configured to engage with features (e.g., tabs) of the sidewall 25 of tissue holder 18, to securely attach onto the tissue holder 18, thereby allowing the cover 202 to retain the tissue samples within tissue compartments 22.

As shown in FIG. 6B, the tissue holder 18 comprises a rim with a top surface 222. The cover 202 of the tissue holder cap 200 comprises a sealing portion 224 extending around the circumference of the cover 200. The sealing portion 224 is configured to mate with the top surface 222 at the rim of the tissue holder 18. The sealing portion 224 of the cover 202 has a bottom face 226 for abutment against the top surface 222 of the rim of the tissue holder 18.

In certain embodiments, the dividing walls 23 of the tissue holder 18 may be shorter than the circumferential wall 25 of the tissue holder 18. In these embodiments, cover 202 may be configured to prevent migration of tissue samples between tissue storage compartments during storage. For example, as shown in FIG. 6B, the sealing portion 224 of the cover 202 is raised or elevated relative to the central portion of the cover 202 such that the inner surface 203*b* of the cover 202 is lower or recessed relative to the bottom face 226 of the sealing portion 224 of the cover 202. This allows the inner surface 203*b* of the cover 202 to cooperate with the dividing walls 23 to minimize the gap formed between the cover 202 and the dividing walls 23 and prevent tissue samples in the tissue storage compartments 22 from migrating out of the tissue storage compartments 22. In some embodiments, the inner surface 203*b* may abut the top sides of the respective dividing walls 23. In other embodiments, the inner surface 203*b* may not abut the top sides of the respective dividing walls 23. Instead, the inner surface 203*b* may form a slight gap with each of the top sides of the dividing walls 23. For example, in some embodiments, the inner surface 203*b* may be spaced away from the top side of each of the dividing walls 23 in the tissue holder 18 by a distance that is less than 0.1 inch, or that is less than 0.05 inch, or that is less than 0.04 inch, or that is less than 0.03 inch.

In other embodiments, the top of each dividing wall 23 may be flushed with the top surface 222 of the rim. In such cases, the inner surface 203*b* of the cover 202 may be flushed with the bottom surface 226 of the sealing portion 224.

In the illustrated embodiments, the opening 204 at the center of the cover 202 is configured to accommodate the post 230 of the tissue holder 18. When using the tissue holder cap 200 to cover the tissue holder 18, the cover 202 is lowered onto the tissue holder 18 so that the post 230 extends into the opening 204 of the cover 202. The post 230 functions as a guide to guide the cover 202 onto the tissue holder 18, so that the cover 202 will be centered with respect to the tissue holder 18.

As shown in the figure, the post 230 of the tissue holder 18 comprises multiple recesses 232, and the tissue holder cap 200 further comprises a first protrusion 206 and a second protrusion 206 for respectively mating with the recesses 232 of the post 230 of the tissue holder 18. The protrusions 206 and the recesses 232 allow the tissue holder cap 200 to be selectively placed at one of a plurality of available angular positions with respect to the tissue holder 18. In the illustrated embodiments, the post 230 of the tissue holder 18 has recesses 232 disposed circumferentially along an exterior surface of the post 230. In other embodiments, the post 230 may have only two recesses (e.g., first and second recesses disposed opposite from each other). Also, in the illustrated embodiments, the first protrusion 206 and the second protrusion 206 are on opposite sides of the opening 204 of the cover 202. In other embodiments, the protrusions 206 may not be opposite from each other. Instead, they may be at other angular positions with respect to each other. In addition, in other embodiments, the tissue holder cap 202 may have more than two protrusions 206, or only one protrusion 206.

As shown in FIG. 6A, the tissue holder 18 includes a plurality of tabs 260 along an outer surface of the sidewall of the tissue holder 18. Each latch 220 is configured (e.g., sized and/or positioned) to be accommodated between two of the tabs 260 as the tissue holder cap 200 is being placed onto the tissue holder 18. In the illustrated embodiments, each latch 220 is at a certain position with respect to the protrusion 206, which allows the latch 220 to be automatically aligned with a spacing between two of the tabs 260 when the protrusion 206 is inserted into one of the recesses 232 at the post 230 of the tissue holder 18. In the illustrated embodiments, each latch 220 is radially aligned with a corresponding protrusion 206. In other words, the latch 220 and the corresponding protrusion 206 are aligned along a radial line. This is the case because each recess 232 at the post 230 is also radially aligned with a spacing between two of the tabs 260. In other embodiments, the latches 220 may not radially align with the protrusions 206. For example, in other embodiments, each recess 232 at the post 230 may not align with a spacing between two of the tabs 260. In such cases, the protrusion 206 and the latch 220 of the tissue holder cap 200 may form an angular position with respect to each other that corresponds with the angular offset between the recess 232 and the spacing between two of the tabs 260.

In the illustrated embodiments, each latch 220 has a hook (anchor) 240 at the bottom end of the latch 220 (FIG. 6B). Each latch 220 is configured to anchor against the bottom 21 of the tissue holder 18 via the hook 240 of the latch 220. In particular, the latches 220 are configured to anchor against respective bottom parts of the bottom 21. Each latch 220 is elastically moveable (e.g., by bending action) relative to the cover 202. This allows the latches 220 to flex outward radially in response to the hooks 240 of the latches 220 engaging the circumferential sidewall 25 of the tissue holder 18, as the tissue holder cap 200 is lowered relative to the tissue holder 18. After the hooks 240 pass the bottom 21 of the tissue holder 18, the latches 220 elastically return to their unstressed state, and the hooks 240 move inward radially to anchor against the bottom 21 of the tissue holder 18.

In the illustrated embodiments, the tissue holder cap 200 also includes ledges 208 at the perimeter 203 of the cover 202. The ledges 208 have respective vertical walls configured for placement between two adjacent tabs 260 of the tissue holder 18. The ledges 208 provide additional security to prevent the tissue holder cap 200 from rotating with respect to the tissue holder 18. In other embodiments, instead of having two ledges 208, the tissue holder cap 200 may have more than two ledges 208, or just one ledge 208. In further embodiments, the ledges 208 are optional, and the tissue holder cap 200 may not include any ledge 208.

As shown in FIG. 6A, the cover 202 also comprises a plurality of vent holes 250 located between the perimeter 203 of the cover 202 and the opening 204 of the cover 202. Each vent hole 250 extends through the thickness of the cover 202 to thereby allow air under the cover 202 to move across the cover 202 to the space above the cover 202. This is particularly useful when the tissue holder 18 with the attached tissue holder cap 200 is placed into a Formalin jar for preservation of the tissue samples. As the tissue holder 18 sinks into the liquid inside the Formalin jar, the vent holes 250 allow air underneath the cover 202 to move across the cover 202 to the space above it. This has the technical effect of allowing the tissue holder 250 (with the tissue holder cap 200 attached thereto) to reach the bottom of the Formalin jar more easily and efficiently. The vent holes 250 also allow tissue preserving fluid to enter the tissue holder 18 to preserve the tissue samples. Each vent hole 250 may have a cross-sectional dimension that is less than 0.1 inch, or that is less than 0.05 inch, or that is less than 0.04 inch, or that is 0.03 inch or less.

It should be noted that the tissue holder cap 200 is not limited to the example described above, and that the tissue holder cap 200 may have other configurations in other embodiments.

Figure 7A:
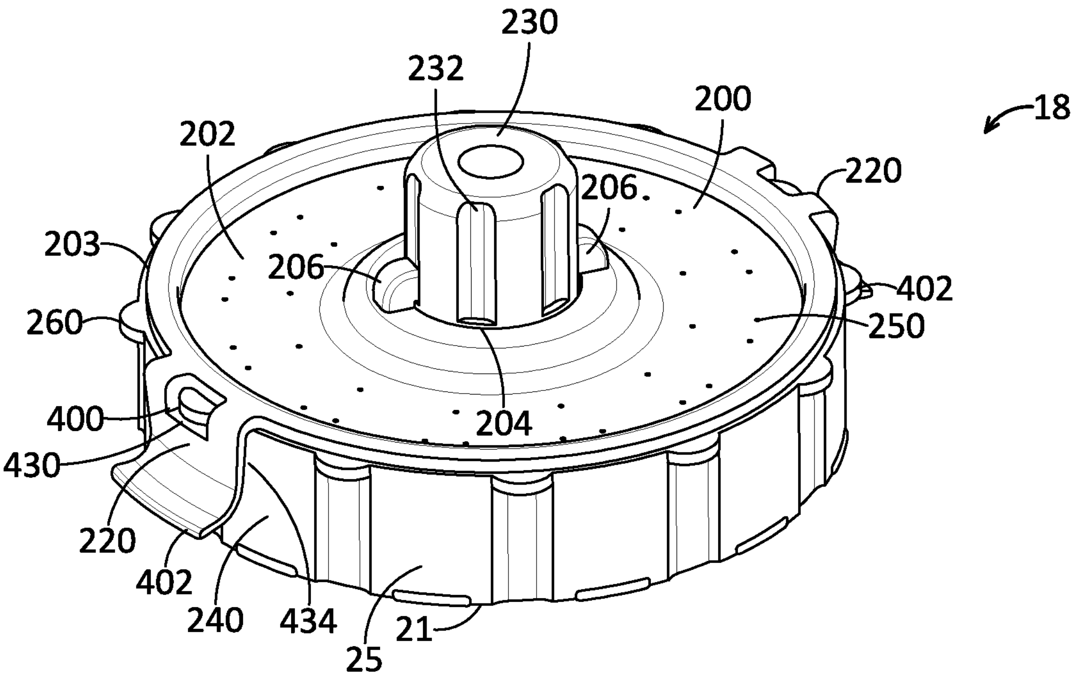
FIGS. 7A-7B illustrate another tissue holder cap for covering a tissue holder according to other embodiments.
Figure 7B:
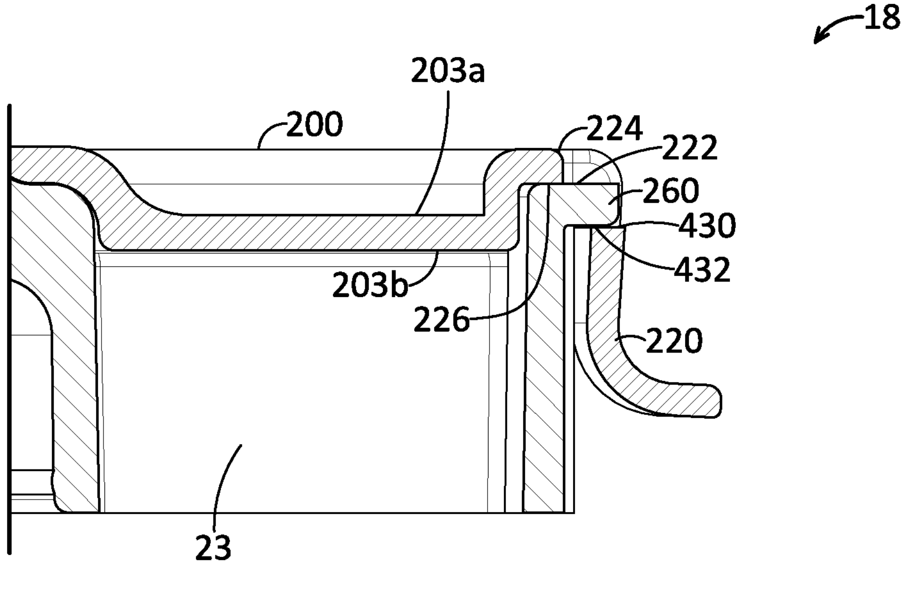

FIGS. 7A-7B illustrate another tissue holder cap 200 for covering a tissue holder 18 according to other embodiments. The tissue holder cap 200 is the same as that described with reference to FIGS. 6A-6B, except that the tissue holder cap 200 in the embodiments of FIGS. 7A-7B has a different type of latch. In particular, as shown in FIG. 7A, the tissue holder cap 200 includes two latches 220 (first latch and second latch) that are positioned on opposite sides of the cover 202. The tissue holder 18 includes a plurality of tabs 260 along a perimeter of the tissue holder 18. The latches 220 are configured to anchor against two of the tabs 260 that are on opposite sides of the tissue holder 18. In the illustrated embodiments, each latch 220 is configured to anchor against only one of the tabs 260. Each latch 220 has a latch opening 400 configured to accommodate one of the tabs 260.

Also, each latch 220 has an anchor surface 430 on one side of the opening 400. The anchor surface 430 is configured to anchor against a bottom side 432 of one of the tabs 260 (FIG. 7B). Each latch 220 is elastically moveable (e.g., by bending action) relative to the cover 202. This allows the latch 220 to flex outward radially in response to the tab 260 pushing against a vertical wall 434 of the latch 220, as the tissue holder cap 200 is lowered relative to the tissue holder 18. After the vertical wall 434 of the latch 220 moves pass the tab 260 of the tissue holder 18, the vertical wall 434 moves radially inward to a position that is below the tab 260, and the latch 220 elastically returns to its unstressed state. When the vertical wall 434 is below the tab 260, the anchor surface 430 of the latch abuts against the bottom side 432 of the tab 260, thereby anchoring the tissue holder cap 200 with respect to the tissue holder 18.

In the illustrated embodiments, the tissue holder cap 200 also includes a first finger-tab 402 extending from the first latch 220, and a second finger tab 402 extending from the second latch 220. Each finger-tab 402 extends radially away from the circumferential sidewall 25, and is located below the inner surface 203*b* of the cover 202 (see FIG. 7B). Each finger-tab 402 is elastically deformable to move the corresponding latch 220 for unlocking the tissue holder cap 200 with respect to the tissue holder 18. In particular, each finger-tab 402 may be pulled to decouple the anchor surface 430 and the bottom side 432 of the tab 260. This also causes the opening 400 of the latch 220 to move up relative to the tab 260, thereby decoupling the tissue holder cap 200 from the tissue holder 18.

In the illustrated embodiments, each latch 220 is at a certain position with respect to the protrusion 206, which allows the latch 220 to be automatically aligned with one of the tabs 260 when the protrusion 206 is inserted into one of the recesses 232 at the post 230 of the tissue holder 18. In the illustrated embodiments, each latch 220 is radially aligned with a corresponding protrusion 206. In other words, the latch 220 and the corresponding protrusion 206 are aligned along a radial line. This is the case because each recess 232 at the post 230 is also radially aligned with one of the tabs 260. In other embodiments, the latches 220 may not radially align with the protrusions 206. For example, in other embodiments, each recess 232 at the post 230 may not align with one of the tabs 260. In such cases, the protrusion 206 and the latch 220 of the tissue holder cap 200 may form an angular position with respect to each other that corresponds with the angular offset between the recess 232 and one of the tabs 260.

Figure 8A:
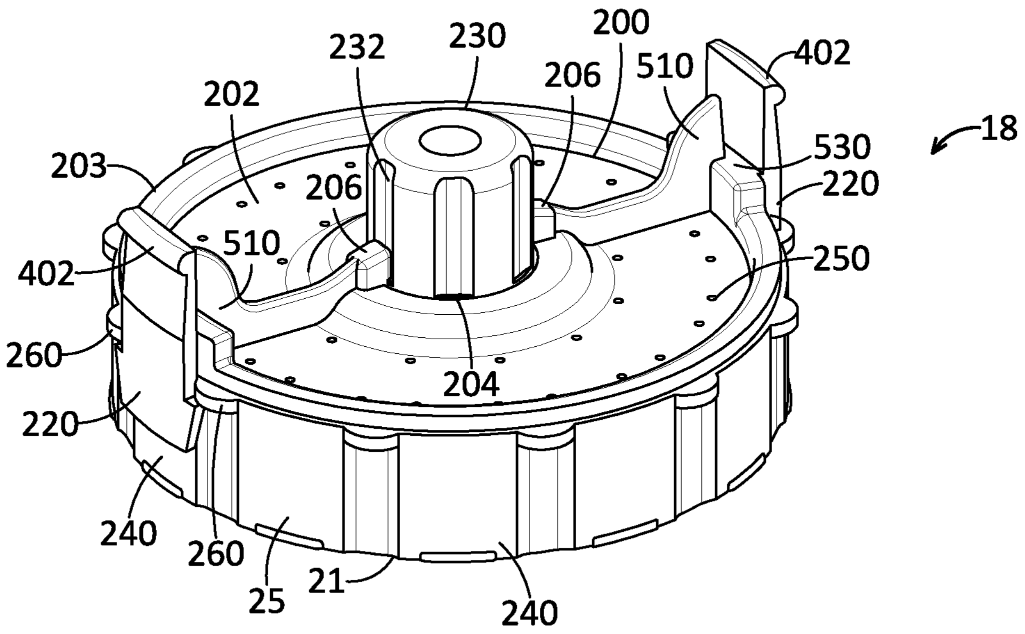
FIGS. 8A-8F illustrate another tissue holder cap for covering a tissue holder according to other embodiments.
Figure 8B:
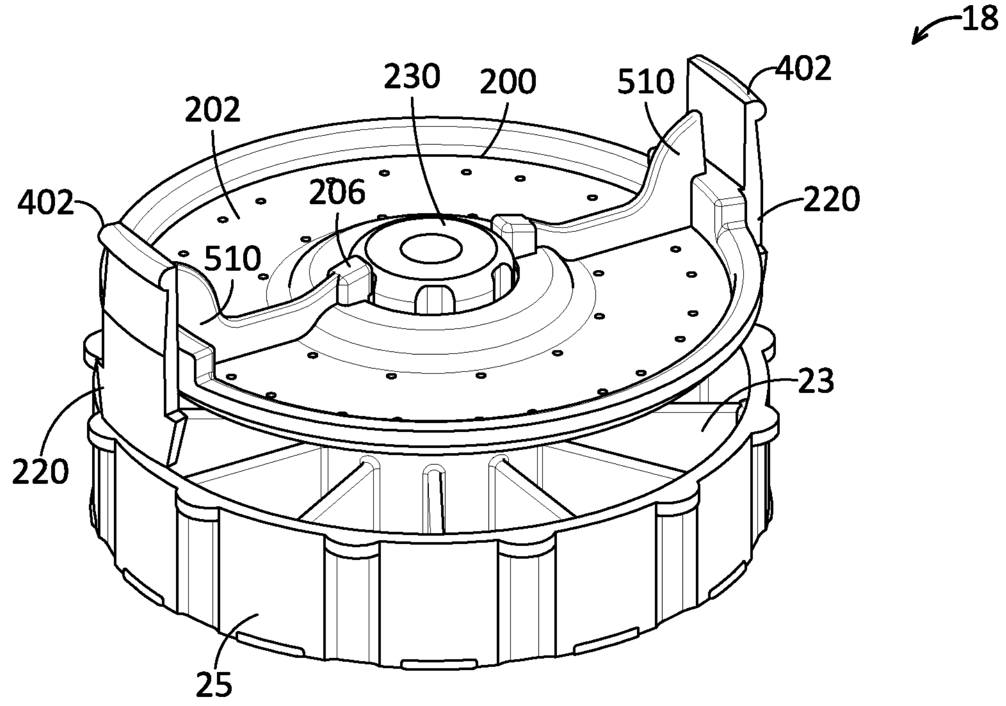
Figure 8C:
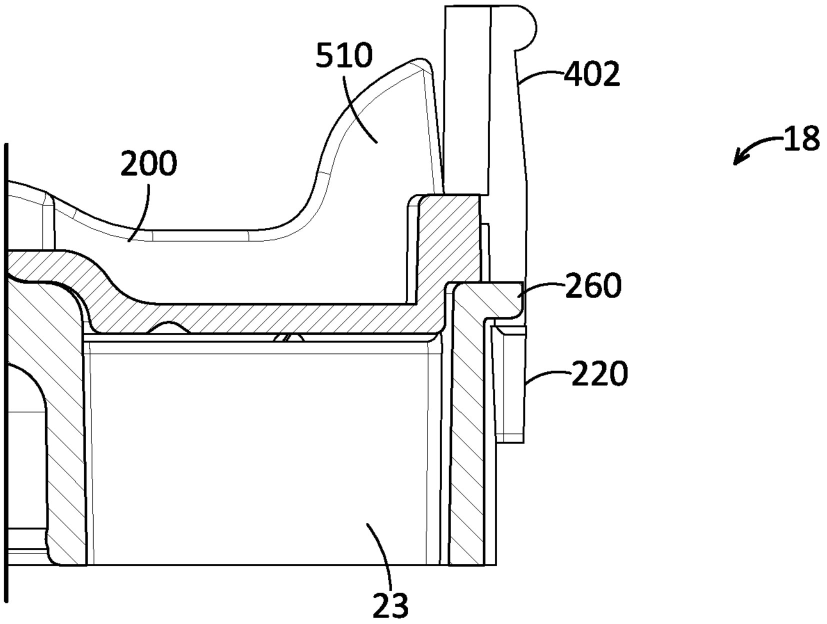
Figure 8D:
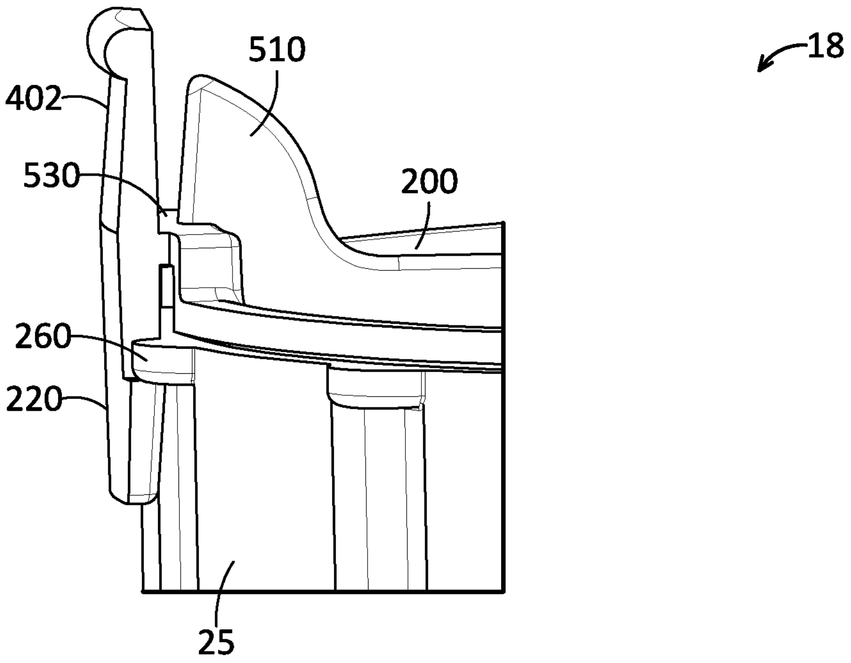

FIGS. 8A-8F illustrate another tissue holder cap 200 for covering a tissue holder 18 according to other embodiments. The tissue holder cap 200 is the same as that described with reference to FIGS. 6A-6B, except that the tissue holder cap 200 in the embodiments of FIGS. 8A-8F has a different type of latch. In particular, as shown in FIGS. 8A-8B, the tissue holder cap 200 includes two latches 220 (first latch and second latch) that are positioned on opposite sides of the cover 202. The tissue holder 18 includes a plurality of tabs 260 along a perimeter of the tissue holder 18. The latches 220 are configured to anchor against two pairs of tabs 260 that are on opposite sides of the tissue holder 18. In the illustrated embodiments, each latch 220 is configured to anchor against two tabs 260.

Figure 8E:
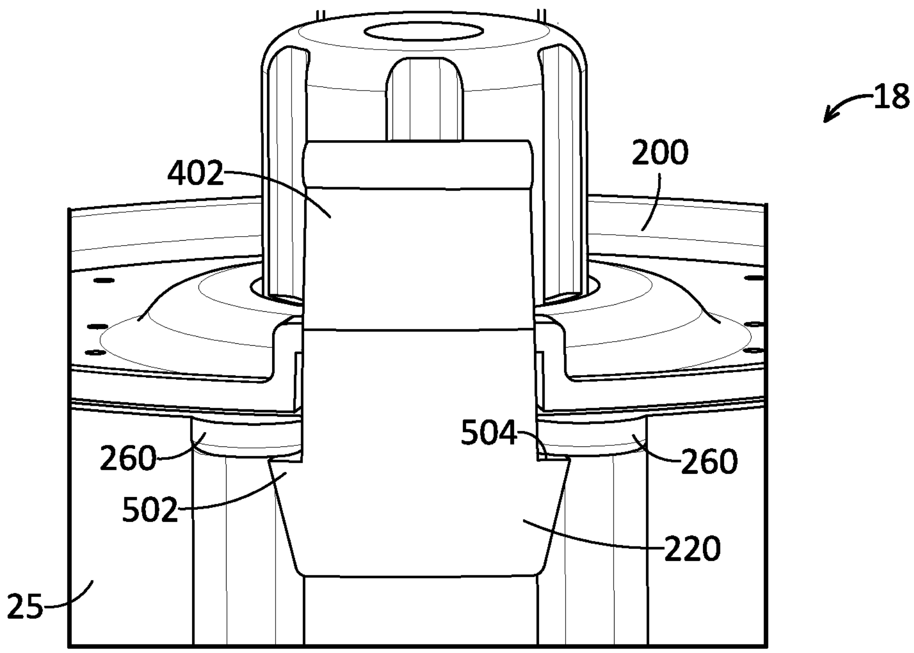

As shown in FIG. 8E, each latch 220 comprises a first anchor 502 and a second anchor 504 configured to simultaneously anchor against two of the tabs 260, respectively. The anchors 502, 504 are configured to anchor against bottom sides of two adjacent tabs 260 respectively (see FIGS. 8A and 8E). Each latch 220 is elastically moveable (e.g., by bending action) relative to the cover 202. This allows the latch 220 to flex outward radially in response to the two adjacent tabs 260 pushing against vertical walls of the respective anchors 502, 504, as the tissue holder cap 200 is lowered relative to the tissue holder 18. After the vertical walls of the respective anchors 502, 504 move pass the tabs 260 of the tissue holder 18, the vertical wall 434 moves radially inward to a position that is below the tabs 260, and the latch 220 elastically returns to its unstressed state. When the anchors 502, 504 are below the tabs 260, they abut against the bottom sides of the respective tabs 260, thereby anchoring the tissue holder cap 200 with respect to the tissue holder 18.

In the illustrated embodiments, the tissue holder cap 200 also includes a first finger-tab 402 extending from the first latch 220, and a second finger tab 402 extending from the second latch 220. Each finger-tab 402 extends upward, and is located above the outer surface 203*a* of the cover 202 (see FIG. 8C). Each finger-tab 402 is connected to the cover 202 via an elastically deformable joint 530, which allows the finger-tab 402 to move the corresponding latch 220 for unlocking the tissue holder cap 200 with respect to the tissue holder 18. In particular, the finger-tabs 402 may be squeezed towards each other to pivot the latches 220 about the joints 530 so that the latches 220 moves radially outward away from the circumferential sidewall 25, thereby decoupling the anchors 502, 504 from the tabs 260.

In the illustrated embodiments, each latch 220 is at a certain position with respect to the protrusion 206, which allows the latch 220 to be automatically aligned with a spacing 240 between two adjacent tabs 260 when the protrusion 206 is inserted into one of the recesses 232 at the post 230 of the tissue holder 18. In the illustrated embodiments, each latch 220 is radially aligned with a corresponding protrusion 206. In other words, the latch 220 and the corresponding protrusion 206 are aligned along a radial line. This is the case because each recess 232 at the post 230 is also radially aligned with a corresponding space between two adjacent tabs 260. In other embodiments, the latches 220 may not radially align with the protrusions 206. For example, in other embodiments, each recess 232 at the post 230 may not align with the space between two adjacent tabs 260. In such cases, the protrusion 206 and the latch 220 of the tissue holder cap 200 may form an angular position with respect to each other that corresponds with the angular offset between the recess 232 and the space between two of the tabs 260.

As shown in FIGS. 8A-8D, the tissue holder cap 200 further includes stoppers 510 configured to prevent over-flexing of the respective finger-tabs 402. Each stopper 510 is in a form of a vertical structure (e.g., rib) that is located behind the corresponding finger-tabs 402. The vertical structure (or rib) implementing the stopper 510 extends from the protrusion 206. In other embodiments, the vertical structure may be shorter, and may not extend from the protrusion 206. Each stopper 510 is spaced away from the finger-tab 402 by a distance that defines a movement range of the finger-tab 402. When a user presses the finger-tab 402 radially towards a center axis of the tissue holder cap 200, the finger-tab 402 will move until it abuts against the stopper 510. In other embodiments, the stoppers 510 may have other configurations (e.g., shapes). For example, in other embodiments, each stopper 510 may be in a form of a post, a block, etc. In further embodiments, the tissue holder cap 200 may not include any stopper 510.

Figure 8F:
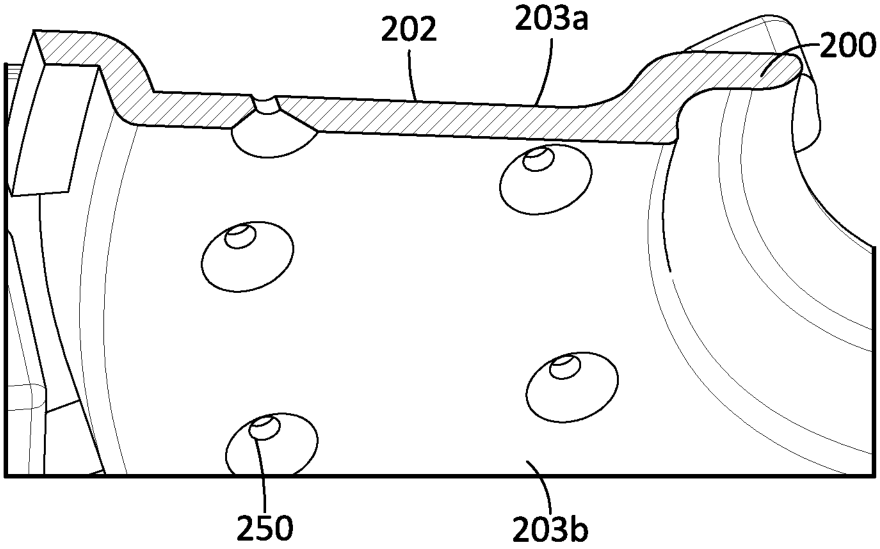

As shown in FIG. 8F, each vent hole 250 has a cross-sectional dimension or diameter that decreases from the bottom side of the cover 202 towards the top side of the cover 202. The vent holes 250 allow air to escape but prevent tissue sample from escaping the tissue holder 18. In other embodiments, the vent holes 250 may have a constant cross-sectional dimension through the thickness of the cover 202.

Figure 9A:
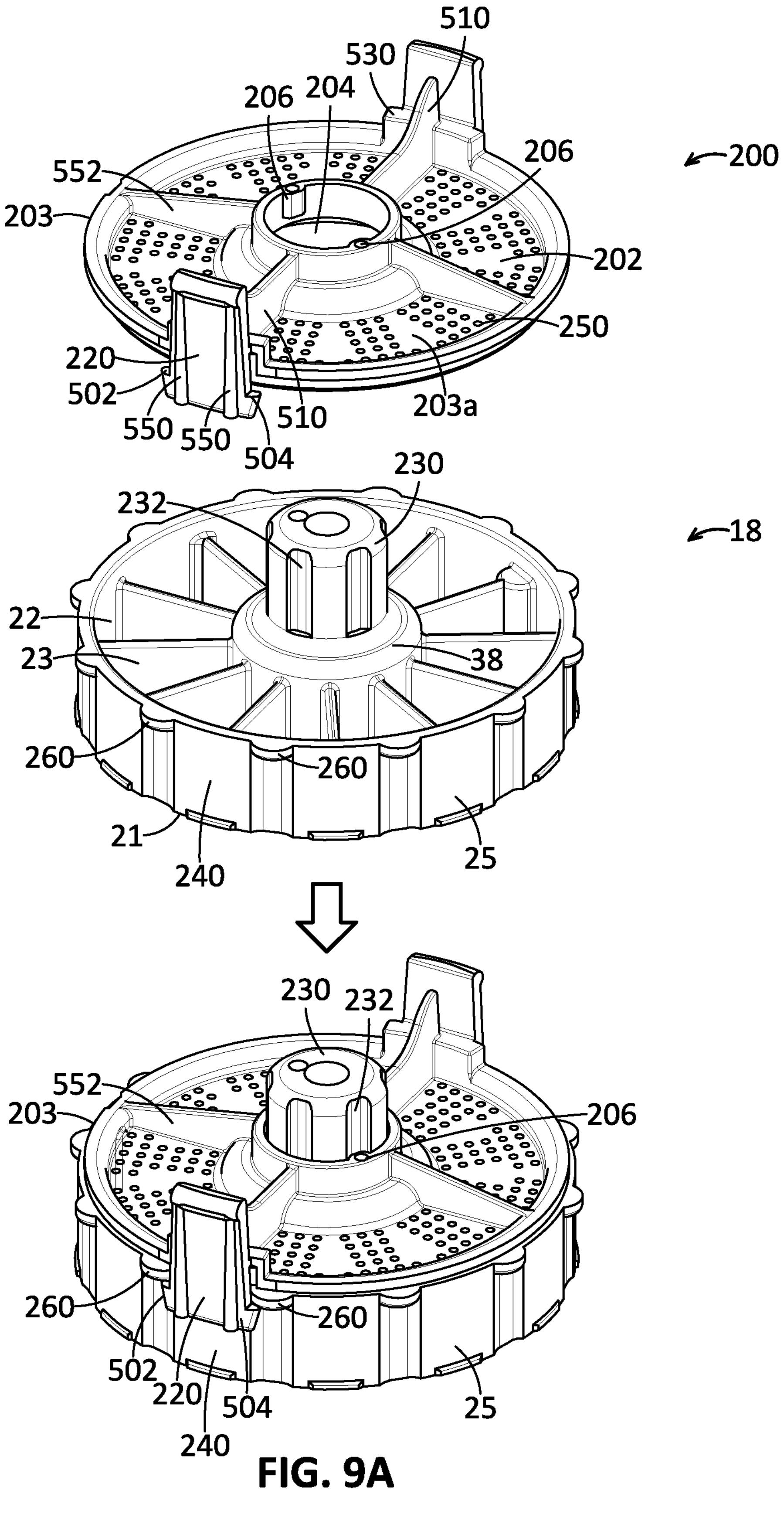
FIGS. 9A-9C illustrate another tissue holder cap for covering a tissue holder according to other embodiments.
Figure 9B:
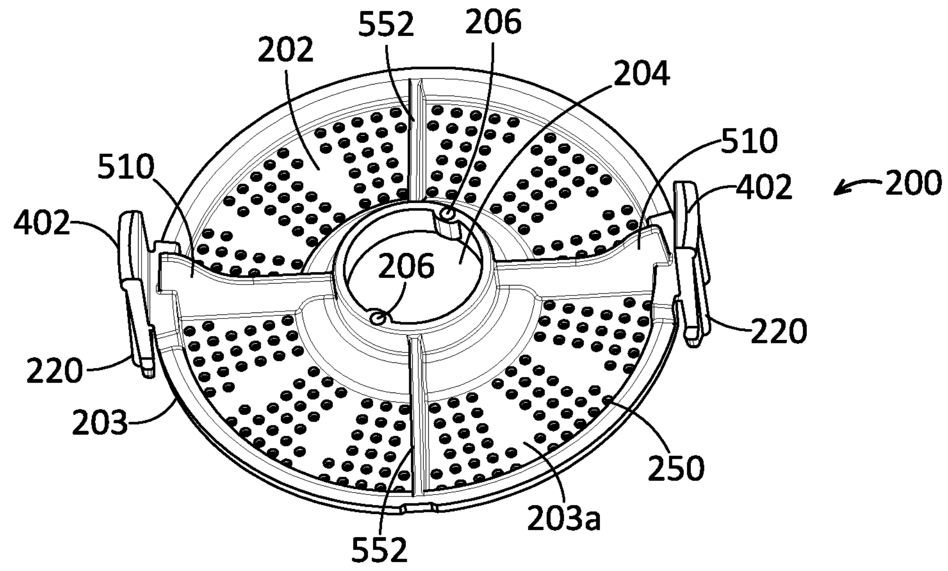
Figure 9C:
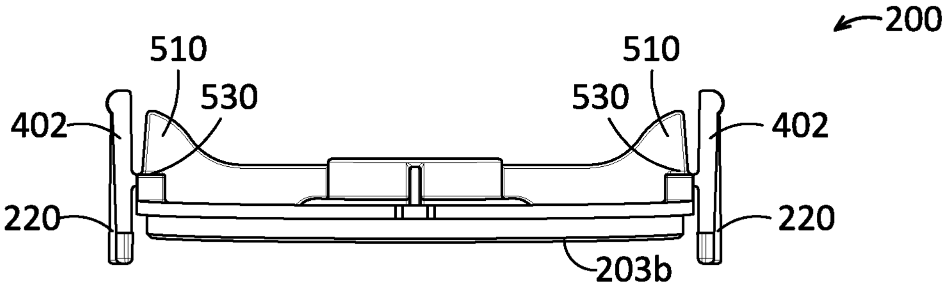

FIGS. 9A-9C illustrate another tissue holder cap 200 for covering a tissue holder 18 according to other embodiments. The tissue holder cap 200 is the same as that described with reference to FIGS. 8A-8F, except that each of the latches 220 of the tissue holder cap 200 in the embodiments of FIGS. 9A-9C has ribs 550 for reinforcing the latch 220. In particular, as shown in FIGS. 9A-9C, the tissue holder cap 200 includes two latches 220 (first latch and second latch) that are positioned on opposite sides of the cover 202. The tissue holder 18 includes a plurality of tabs 260 along a perimeter of the tissue holder 18. The latches 220 are configured to anchor against two pairs of tabs 260 that are on opposite sides of the tissue holder 18, In the illustrated embodiments, each latch 220 is configured to anchor against two tabs 260. In the illustrated embodiments, each latch has two vertical ribs 550 for increasing the structural integrity of the latch 220. In other embodiments, each latch 220 may have more than two ribs 550 or only one rib 550. Also, in further embodiments, instead of vertical rib(s) 550, each latch 220 may have rib(s) oriented in other directions.

As shown in FIG. 9A, each latch 220 comprises a first anchor 502 and a second anchor 504 configured to simultaneously anchor against two of the tabs 260, respectively. The anchors 502, 504 are configured to anchor against bottom sides of two adjacent tabs 260 respectively. Each latch 220 is elastically moveable (e.g., by bending action) relative to the cover 202. This allows the latch 220 to flex outward radially in response to the two adjacent tabs 260 pushing against vertical walls of the respective anchors 502, 504, as the tissue holder cap 200 is lowered relative to the tissue holder 18. After the vertical walls of the respective anchors 502, 504 move pass the tabs 260 of the tissue holder 18, the vertical wall 434 moves radially inward to a position that is below the tabs 260, and the latch 220 elastically returns to its unstressed state. When the anchors 502, 504 are below the tabs 260, they abut against the bottom sides of the respective tabs 260, thereby anchoring the tissue holder cap 200 with respect to the tissue holder 18.

In the illustrated embodiments, the tissue holder cap 200 also includes a first finger-tab 402 extending from the first latch 220, and a second finger tab 402 extending from the second latch 220. Each finger-tab 402 extends upward, and is located above the outer surface 203*a* of the cover 202 (see FIG. 9A). Each finger-tab 402 is connected to the cover 202 via an elastically deformable joint 530, which allows the finger-tab 402 to move the corresponding latch 220 for unlocking the tissue holder cap 200 with respect to the tissue holder 18. In particular, the finger-tabs 402 may be squeezed towards each other to pivot the latches 220 about the joints 530 so that the latches 220 moves radially outward away from the circumferential sidewall 25, thereby decoupling the anchors 502, 504 from the tabs 260. As shown in the figure, each rib 550 extends to the finger-tab 402 so that the rib 550 also reinforces the strength of the finger-tab 402 (in addition to enforcing the strength of the latch 220).

In the illustrated embodiments, each latch 220 is at a certain position with respect to the protrusion 206, which allows the latch 220 to be automatically aligned with a spacing 240 between two adjacent tabs 260 when the protrusion 206 is inserted into one of the recesses 232 at the post 230 of the tissue holder 18. In the illustrated embodiments, the protrusion 206 and the latch 220 of the tissue holder cap 200 form an angular position with respect to each other that corresponds with the angular offset between the recess 232 and the space between two of the tabs 260. In other embodiments, the latches 220 may radially align with the protrusions 206. In other words, the latch 220 and the corresponding protrusion 206 may aligned with each other along a radial line.

As shown in FIGS. 9A-9C, the tissue holder cap 200 further includes stoppers 510 configured to prevent over-flexing of the respective joints 530. Each stopper 510 is in a form of a vertical structure that is located behind the corresponding finger-tabs 402. Each stopper 510 is spaced away from the finger-tab 402 by a distance that defines a movement range of the finger-tab 402. When a user presses the finger-tab 402 radially towards a center axis of the tissue holder cap 200, the finger-tab 402 will move until it abut against the stopper 510. In other embodiments, the stoppers 510 may have other configurations (e.g., shapes). For example, in other embodiments, each stopper 510 may be in a form of a post, a block, etc. In further embodiments, the tissue holder cap 200 may not include any stopper 510.

As shown in FIGS. 9A and 9B, the tissue holder cap 200 also includes ribs 552 above the cover 202 for reinforcing the cover 202. The ribs 552 provide the cover 202 with additional stiffness so that the cover 202 may not deform as easily. Although two ribs 552 are shown, in other embodiments, the tissue holder cap 200 may have more than two ribs 552, or only one rib 552. Also, in other embodiments, the ribs 552 may be in a form of blocks instead of planar structures.

As shown in FIGS. 9A-9B, the cover 202 also comprises a plurality of vent holes 250 located between the perimeter 203 of the cover 202 and the opening 204 of the cover 202. Each vent hole 250 extends through the thickness of the cover 202 to thereby allow air under the cover 202 to move across the cover 202 to the space above the cover 202. This is particularly useful when the tissue holder 18 with the attached tissue holder cap 200 is placed into a Formalin jar for preservation of the tissue samples. As the tissue holder 18 sinks into the liquid inside the Formalin jar, the vent holes 250 allow air underneath the cover 202 to move across the cover 202 to the space above it. This has the technical effect of allowing the tissue holder 250 (with the tissue holder cap 200 attached thereto) to reach the bottom of the Formalin jar more easily and efficiently. The vent holes 250 also allow tissue preserving fluid to enter the tissue holder 18 to preserve the tissue samples. Each vent hole 250 may have a cross-sectional dimension that is less than 0.1 inch, or that is less than 0.05 inch, or that is less than 0.04 inch, or that is 0.03 inch or less. As similarly discussed with reference to FIG. 8F, each vent hole 250 in the embodiments of FIGS. 9A-9B has a cross-sectional dimension or diameter that decreases from the bottom side of the cover 202 towards the top side of the cover 202. The vent holes 250 allow air to escape but prevent tissue sample from escaping the tissue holder 18. In other embodiments, the vent holes 250 may have a constant cross-sectional dimension through the thickness of the cover 202.

Also, as shown in FIGS. 9A-9B, the cover 202 may include a plurality of small diameter vent holes that may be patterned to align with the tissue storage compartments 22. The number and arrangement of the vent holes may vary. For example, the number of vent holes may increase from opening 204 towards the sealing portion 224.

Figure 10:
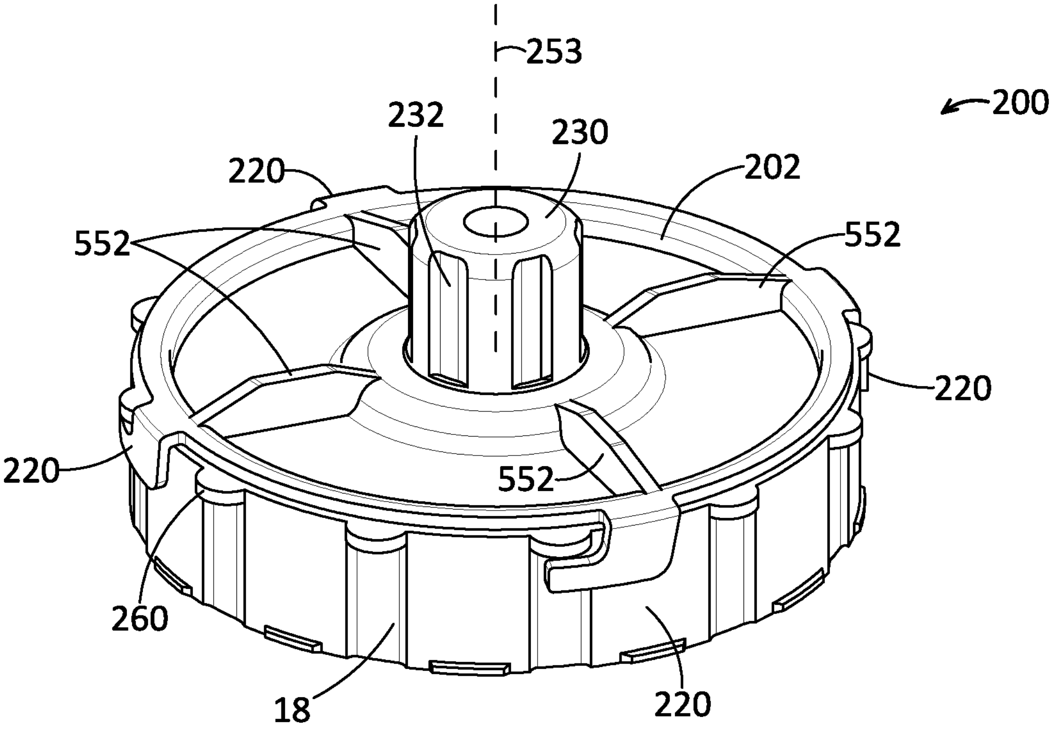
FIG. 10 illustrates another tissue holder cap for covering a tissue holder according to other embodiments.

FIG. 10 illustrates another tissue holder cap 200 for covering a tissue holder 18 according to other embodiments. The tissue holder cap 200 is the same as that described with reference to FIGS. 6A-8B, except that the tissue holder cap 200 in the embodiments of FIG. 10 has four latches 220 that are configured to anchor against respective four tabs 260 at the circumferential sidewall of the tissue holder 18. As shown in the figure, two latches 220 in a first pair are radially aligned and are disposed on opposite sides of the tissue holder cap 200, and two other latches 220 in a second pair are radially aligned and are disposed on opposite sides of the tissue holder cap 200. The four latches 220 are circumferentially spaced apart from each other, and each latch 220 is 90° apart from adjacent latches 220. In other embodiments, there may be only two latches 220 or more than four latches 220. Also, in other embodiments, two latches 220 may not aligned with each other radially. As shown in the figure, the tissue holder cap 200 also includes ribs 552 at the outer surface of the cover 202. The ribs 552 are configured to reinforce the cover 202 to make it stiffer and/or stronger. To secure the tissue holder cap 200 against the tissue holder 18, the tissue holder cap 200 is placed around the post 230 of the tissue holder 18, and is lowered onto the rim of the tissue holder 18. Each latch 220 is sized to fit through between two adjacent tabs 260. Accordingly, the cover 202 of the tissue holder cap 200 is lowered until the latches 220 have passed through the respective pairs of adjacent tabs 260. The tissue holder cap 200 is then rotated about axis 253 to turn the four latches 220 circumferentially to place respective anchors of the latches 220 below four respective tabs 260, thereby locking the tissue holder cap 200 against the tissue holder 18.

Figure 11:
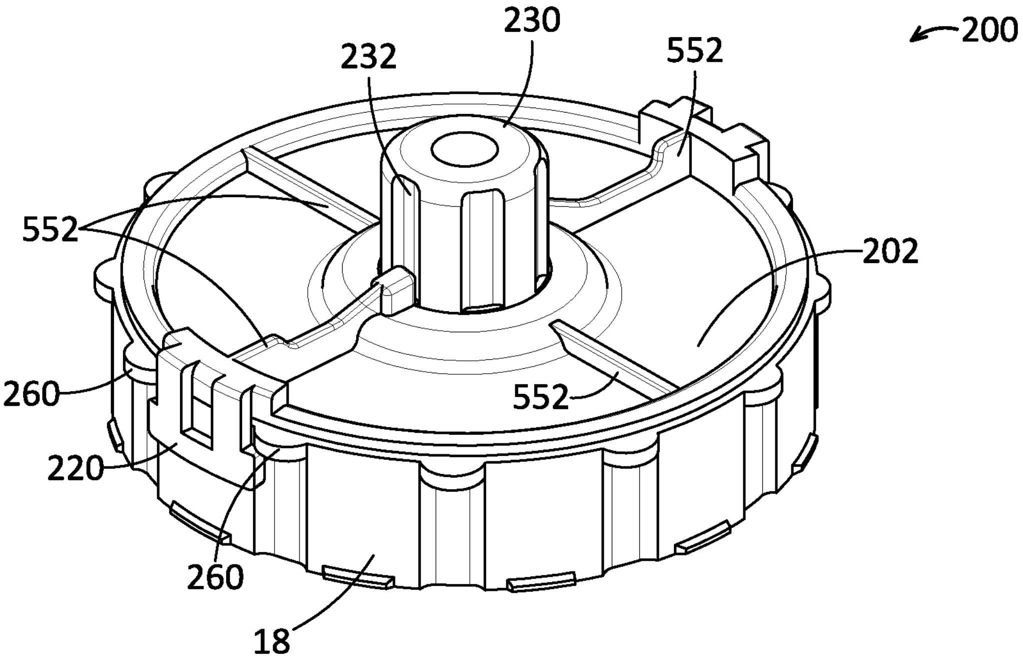
FIG. 11 illustrates another tissue holder cap for covering a tissue holder according to other embodiments.

FIG. 11 illustrates another tissue holder cap 200 for covering a tissue holder 18 according to other embodiments. The tissue holder cap 200 is the same as that described with reference to FIGS. 8A-8F, except that the tissue holder cap 200 does not include the finger-tabs 402. In the illustrated embodiments of FIG. 11, each latch 220 is configured to anchor against two tabs 260. In other embodiments, each latch 220 may have one or more vertical ribs (like the ribs 550 described with reference to FIGS. 8A-8F) for increasing the structural integrity of the latch 220. Also, in further embodiments, instead of vertical rib(s) 550, each latch 220 may have rib(s) oriented in other directions. As shown in FIG. 11, the tissue holder cap 200 also includes ribs 552 at the outer surface of the cover 202, The ribs 552 are configured to reinforce the cover 202 to make it stiffer and/or stronger. To secure the tissue holder cap 200 against the tissue holder 18, the tissue holder cap 200 is placed around the post 230 of the tissue holder 18, and is lowered onto the rim of the tissue holder 18. Due to the width of the latch 220 being wider than a spacing between adjacent tabs 260, the latch 220 will be elastically urged radially outward as the latch 220 passes around the two tabs 260. After the latch 220 passes the two adjacent tabs 260, the latch 220 will elastically spring back radially to place the anchors below the adjacent tabs 260, thereby locking the tissue holder cap 200 against the tissue holder 18. To remove the tissue holder cap 200 from the tissue holder 18, the latches 220 may be pulled radially away from the circumferential sidewall 18 of the tissue holder 18, and the tissue holder cap 200 may then be lifted upward to remove it from the tissue holder 18.

Figure 12A:
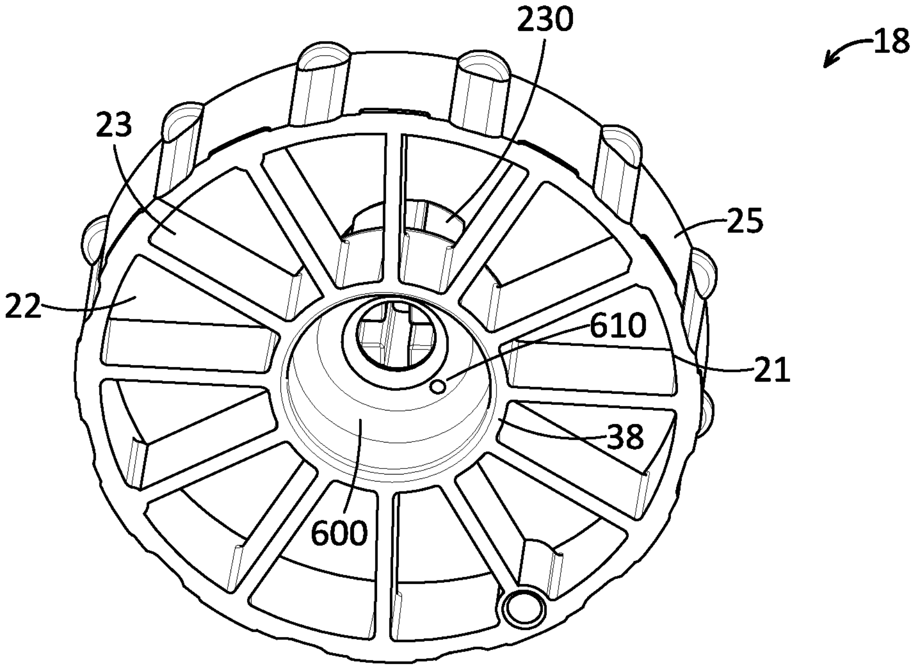
FIG. 12A illustrates a bottom, perspective, view of a tissue holder.
Figure 12B:
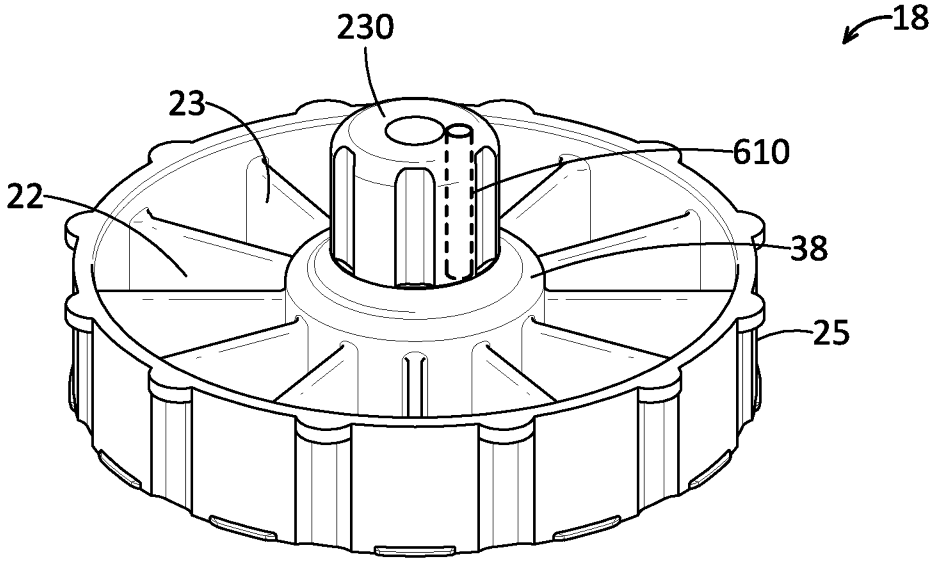
FIG. 12B illustrates a top, perspective, view of a tissue holder.

In one or more embodiments described herein, to further assist the tissue holder 18 with the attached tissue holder cap 200 in submerging into a solution of tissue preserving fluid, the tissue holder 18 may include a channel for allowing air in the tissue holder 18 to escape. FIG. 12A illustrates a bottom, perspective, view of a tissue holder 18 in accordance with some embodiments. FIG. 12B illustrates a top, perspective, view of the tissue holder 18. As shown in FIGS. 12A-12B, the tissue holder 18 includes: a bottom 21 with a filter 24, a circumferential sidewall 25 extending upward from the bottom 21, and a hub 38 having a cavity 600. The tissue holder 18 also includes a plurality of dividing walls 23 extending from the hub 38 to define a plurality of tissue storage compartments 22. The tissue holder 18 also includes a post 230 extending upward from the hub 38. The tissue holder 18 is the same as that described previously with reference to FIGS. 1-11, except that the tissue holder 18 in FIGS. 12A-12B further includes a channel 610 extending from the cavity 600 of the hub 38 into the post 230, wherein the channel 610 is off-center with respect to the post 230. The channel 610 is advantageous because it allows air trapped within the cavity 600 of the hub 38 to escape via the channel 610 into the open space that is outside the tissue holder 18. Accordingly, when the tissue holder 18 with the attached tissue holder cap 200 is placed into a solution of tissue preserving fluid (e.g., into a Formalin jar), the tissue holder 18 with the tissue holder cap 200 will not "float" and will instead sink to the bottom of, or within, the solution of tissue preserving fluid easily and efficiently.

It should be noted that the tissue holder cap 200 is not limited to the examples described herein, and that the tissue holder cap 200 may have other configurations in other embodiments. For example, in other embodiments, the tissue holder cap 200 may have more than two latches 220, one latch 220, or no latch. Also, in other embodiments, the latch 220 may have a different configuration from the examples described. Furthermore, in other embodiments, the tissue holder cap 200 may have other types of securing mechanism for detachably securing the tissue holder cap 200 against the tissue holder 18. For example, in other embodiments, the tissue holder cap 200 may have circumferential flange extending around the perimeter of the cover 202. The circumferential flange is configured to detachably snap onto the rim and/or the tabs 260 at the top of the circumferential sidewall 25 of the tissue holder 18. In still further embodiments, the tissue holder cap 200 may include more than two protrusions 206, one protrusion 206, or may not include the protrusion 206.

Also, it should be noted that the tissue holder 18 is not limited to the examples described herein, and that the tissue holder 18 may have other configurations in other embodiments. For example, in other embodiments, the tissue holder 18 may not include the tabs 260. In addition, in other embodiments, the post 230 of the tissue holder 18 may include more than two recesses 232, one recess 232, or may not include the recess 232.

In some embodiments, the tissue holder cap 200 in any of the embodiments described herein may be combined with the tissue holder 18 to provide tissue storage system. Also, in some embodiments, the tissue storage system may optionally further include a jar configured to accommodate both the tissue holder 18 and the tissue holder cap 200. For example, the jar may contain a tissue preserving fluid, such as Formalin, or any of other substances that can preserve tissue samples. The jar may also include a jar cover for covering the jar.

A method of handling tissue samples performed using the tissue holder 18 and the tissue holder cap 200 will now be described. First, the tissue holder 18 without the tissue holder cap 200 is loaded into the tissue holder assembly 10 of the tissue biopsy system 50 (see FIG. 1 and FIG. 4). While inside the tissue holder assembly 10, the tissue holder 18 is rotated relative to the base 14 and the cover 16 of the tissue holder assembly 10 to sequentially receive tissue samples retrieved by the biopsy device 60, and to sequentially place the tissue samples at an imaging position with respect to the imaging device 66 for allowing the imaging device 66 to image the tissue samples sequentially (FIG. 4). In particular, after the biopsy device 60 retrieves a tissue sample from a patient, the tissue sample is transported to within the tissue holder assembly 10 and is deposited into one of the tissue storage compartments 22 in the tissue holder 18. The tissue holder 18 is then rotated within the tissue holder assembly 10 to place that tissue sample in an imaging position. The imaging device 66 then images that tissue sample while it is in the imaging position. The biopsy device 60 also retrieves additional tissue samples from the patient, and the above actions are repeated until all of the tissue samples in the tissue holder 18 have been imaged.

After the tissue samples have been imaged, the tissue holder 18 may then be used to store the tissue samples. For this purpose, the cover 16 of the tissue holder assembly 10 is first removed from the base 14 to expose the tissue holder 18 therein. Then the tissue holder cap 200 is placed over the tissue holder 18 and is pushed downward to secure the tissue holder cap 200 relative to the tissue holder 18. When the tissue holder cap 200 is secured against the tissue holder 18, the tissue holder cap and the tissue holder 18 cannot rotate relative to each other. The tissue holder 18 with the tissue holder cap 200 forms a tissue storage system, which is then removed from the base 14 of the tissue holder assembly 10.

The tissue holder 18 with the tissue holder cap 200 attached thereto may then be placed in a container of tissue preserving fluid to store the tissue samples contained within the tissue holder 18. In some cases, a jar of Formalin may be used. In some cases, the tissue holder 18 with the tissue holder cap 200 may simply be placed on top of the tissue preserving fluid. Due to the vent holes 250 at the cover 202 of the tissue holder cap 200, and also due to the channel 610 that extends from the cavity 600 of the hub 38, air underneath the cover 202 and/or air within the cavity 600 of the hub 38 may readily escape to the outside environment. This allows the tissue holder 18 with the attached tissue holder cap 200 to submerge into the tissue preserving fluid easily and efficiently. The tissue preserving fluid enters into the tissue storage compartments 22 in the tissue holder 18 from the bottom 21 of the tissue holder 18 (because it has the porous filter 24), and fills the tissue storage compartments 22 to preserve the tissue samples therein.

As shown in the above embodiments, the tissue holder cap 200 is advantageous because it allows the tissue holder 18, which is otherwise designed for use during imaging of tissue samples, to be used again for the additional purpose of storage and separation of tissue samples after the imaging process is completed. Without the tissue holder cap 200, a clinician would need to individually handle and process each tissue sample manually after the imaging is completed in order to store all of the tissue samples. The tissue holder cap 200 obviates this tedious and inefficient manual process by keeping the tissue samples in the tissue holder 18 while the tissue samples are submerged inside tissue preserving fluid after imaging is completed.

Furthermore, the latches 220 described herein provide frictional fit against the tabs 260 at the tissue holder 18, thereby allowing the tissue holder cap 200 to frictionally connect to the tissue holder 18 to securely attach to the tissue holder 18. The frictional engagement between the latches 220 and the tabs 260 also prevent the tissue holder cap 200 from rotating relative to the tissue holder 18. Also, in some embodiments, each latch 220 may be a snap-fit latch. For example, each latch 220 may have one or more anchors that snap onto the tissue holder 18 (e.g., onto the tab(s) 260 of the tissue holder 18) when pushed down against the tissue holder 18. In some embodiments, this feature provides an audible sound when the tissue holder cap 200 is securely engaged with the tissue holder 18, thereby informing a user that the tissue holder cap 200 is desirably secured relative to the tissue holder 18.

A method of handling tissue samples in accordance with some embodiments will now be described. The method may be performed using the tissue holder assembly 10 and the tissue holder cap 200 described herein. The method includes receiving the tissue samples by a tissue holder having a plurality of tissue storage compartments, a hub, and a post extending from the hub, wherein the act of receiving the tissue samples is performed while the tissue holder is moveably located within a tissue holder assembly. The method also includes receiving a first protrusion of a tissue holder cap, by a recess at the post of the tissue holder, to align a first latch of the tissue holder cap with a first part of the tissue holder, and to align a second latch of the tissue holder cap with a second part of the tissue holder. The method further includes securely attaching the tissue holder cap onto the tissue holder to retain the tissue samples within the tissue storage compartments of the tissue holder, wherein the act of securely attaching is performed by the first latch and the second latch of the tissue holder cap anchoring against the tissue holder.

Optionally, in the method, the first part of the tissue holder comprises a first tab at a circumferential sidewall of the tissue holder, and the second part of the tissue holder comprises a second tab at the circumferential sidewall of the tissue holder.

Optionally, in the method, the first part of the tissue holder comprises a first pair of tabs at a circumferential sidewall of the tissue holder, and the second part of the tissue holder comprises a second pair of tabs at the circumferential sidewall of the tissue holder.

Optionally, in the method, the first part of the tissue holder comprises a first bottom part of the tissue holder, and the second part of the tissue holder comprises a second bottom part of the tissue holder.

Although particular embodiments have been shown and described, it will be understood that it is not intended to limit the claimed inventions to the preferred embodiments, and it will be obvious to those skilled in the art that various changes and modifications may be made without department from the scope of the claimed inventions. The specification and drawings are, accordingly, to be regarded in an illustrative rather than restrictive sense. The claimed inventions are intended to cover alternatives, modifications, and equivalents.

The invention claimed is:

1. A tissue holder cap for covering a tissue holder, the tissue holder having a bottom, a circumferential sidewall extending upward from the bottom, a hub, a post extending upward from the hub, and a plurality of dividing walls extending radially outward from the hub to define a plurality of tissue storage compartments, the tissue holder cap comprising:

a cover having a perimeter, the cover having an outer surface and an inner surface opposite from the outer surface, wherein a central portion of the cover comprises an opening extending completely through the outer and inner surfaces and configured for receiving the post of the tissue holder;

a first latch extending from the perimeter of the cover; and a second latch extending from the perimeter of the cover, circumferentially spaced apart from the first latch;

wherein the cover includes a first protrusion configured to engage the post of the tissue holder, the first protrusion radially projecting at least partially into the opening defined within the cover, and wherein when the first protrusion engages with the post, each of the first latch and the second latch automatically aligns with one or more of a plurality of tabs located on the circumferential sidewall of the tissue holder to securely fasten the tissue holder cap onto the tissue holder.

2. The tissue holder cap of claim 1, wherein the cover of the tissue holder cap comprises a sealing portion extending around a circumference of the cover, the sealing portion having a bottom face for abutment against a rim of the circumferential sidewall of the tissue holder, and wherein the inner surface of the cover is recessed relative to the bottom face of the sealing portion.

3. The tissue holder cap of claim 1, wherein the first protrusion of the tissue holder cap is configured for placement within a first recess in the post of the tissue holder when the first protrusion engages with the post.

4. The tissue holder cap of claim 1, wherein the cover further comprises a second protrusion, and wherein the first protrusion and the second protrusion are configured for respectively mating with first and second recesses of the post of the tissue holder.

5. The tissue holder cap of claim 4, wherein the first latch is radially aligned with the first protrusion.

6. The tissue holder cap of claim 1, wherein the first latch is elastically moveable relative to the cover.

7. The tissue holder cap of claim 1, further comprising a first finger-tab extending from the first latch, wherein the first finger-tab is configured to move the first latch for detaching the tissue holder cap from the tissue holder.

8. The tissue holder cap of claim 1, wherein the first latch is configured to anchor against the bottom of the tissue holder.

9. The tissue holder cap of claim 1, wherein the first latch is configured to anchor against one of the plurality of tabs on the circumferential sidewall of the tissue holder, and wherein the first latch comprises a latch opening configured to accommodate the respective one of the plurality of tabs.

10. The tissue holder cap of claim 1, wherein the first latch comprises a first anchor and a second anchor, the first and second anchors configured to simultaneously anchor against adjacent tabs of the plurality of tabs on the circumferential sidewall of the tissue holder.

11. The tissue holder cap of claim 1, wherein the cover comprises a plurality of vent holes located between the perimeter of the cover and the opening of the cover.

12. The tissue holder cap of claim 11, wherein at least one of the plurality of vent holes has a cross sectional dimension that increases along a thickness of the cover.

13. The tissue holder cap of claim 11, wherein a density of the plurality of vent holes increases as a function of distance from the opening.

14. A tissue storage system comprising the tissue holder cap of claim 1, and the tissue holder, wherein the post of the tissue holder comprises a first recess, wherein each adjacent pair of the plurality of tabs of the tissue holder define a space therebetween, and wherein the space or one of the plurality of tabs is radially aligned with the first recess of the post of the tissue holder.

15. A method of handling tissue samples, comprising:

receiving the tissue samples in a tissue holder having a plurality of tissue storage compartments, a hub, and a post extending from the hub, wherein the tissue samples are received into respective tissue storage compartments of the plurality of tissue storage compartments while the tissue holder is located within a tissue holder assembly;

receiving a first protrusion of a tissue holder cap at a recess in the post of the tissue holder to thereby align a first latch of the tissue holder cap with a first part of the tissue holder and align a second latch of the tissue holder cap with a second part of the tissue holder, wherein the act of receiving the first protrusion at the recess is performed by the tissue holder cap having a central portion defining a through opening that the first protrusion at least partially radially projects into with the post of the tissue holder extending through the through opening of the tissue holder cap to receive the first protrusion at the recess; and securely attaching the tissue holder cap onto the tissue holder to retain the tissue samples within the respective tissue storage compartments, wherein the act of securely attaching is performed by the first latch and the second latch of the tissue holder cap anchoring against the tissue holder.

16. The tissue holder cap of claim 7, further comprising a stopper configured to prevent over flexing of the first finger-tab.

* * * * *